US010663280B2

(12) United States Patent
Lipstein et al.

(10) Patent No.: US 10,663,280 B2
(45) Date of Patent: May 26, 2020

(54) SYSTEM AND METHOD FOR MEASURING ECCENTRICITY OF GAS TURBINE CASING RELATIVE TO ROTOR

(71) Applicant: General Electric Company, Schenectady, NY (US)

(72) Inventors: Travis Edwin Lipstein, Greenville, SC (US); Sandra Beverly Kolvick, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 115 days.

(21) Appl. No.: 15/933,614

(22) Filed: Mar. 23, 2018

(65) Prior Publication Data

US 2019/0293405 A1    Sep. 26, 2019

(51) Int. Cl.
| | | |
|---|---|---|
| *G01B 7/312* | (2006.01) | |
| *F01D 21/00* | (2006.01) | |
| *G01M 15/14* | (2006.01) | |
| *G01B 5/24* | (2006.01) | |
| *G01B 17/00* | (2006.01) | |

(Continued)

(52) U.S. Cl.
CPC ........... *G01B 7/312* (2013.01); *F01D 21/003* (2013.01); *G01B 5/242* (2013.01); *G01B 7/282* (2013.01); *G01B 11/2408* (2013.01); *G01B 11/26* (2013.01); *G01B 15/00* (2013.01); *G01B 17/00* (2013.01); *G01B 21/24* (2013.01); *G01M 15/14* (2013.01); *F05D 2260/83* (2013.01)

(58) Field of Classification Search
CPC ...................................................... G01B 7/312

USPC .................................................... 33/543, 550
See application file for complete search history.

(56) References Cited

U.S. PATENT DOCUMENTS

| | | |
|---|---|---|
| RE30,088 E | 9/1979 | Lund et al. |
| 4,644,261 A | 2/1987 | Carter |
| | (Continued) | |

FOREIGN PATENT DOCUMENTS

| | | |
|---|---|---|
| JP | H11160012 A | 6/1996 |
| JP | H11237238 A | 8/1999 |
| | (Continued) | |

OTHER PUBLICATIONS

EP Extended Search Report for related application 19161613.5 dated Jul. 3, 2019; 7 pp.

*Primary Examiner* — George B Bennett
(74) *Attorney, Agent, or Firm* — Armstrong Teasdale LLP

(57) ABSTRACT

A system and method for determining eccentricity of a casing and a rotor of a gas turbine includes a plurality of stationary distance detectors coupled to the casing at known circumferential positions and a rotating distance detector coupled to the rotor or a blade in or near an axial plane defined by the stationary distance detectors. The stationary distance detectors transmit wireless signals to one another to determine a first series of distance measurements between each pair of stationary distance detectors. The rotating distance detector transmits wireless signals to each of the stationary distance detectors, as the rotor is spun, to generate a second series of distance measurements. The measurements are transmitted, over a wireless local area network, to a remote computing device that processes the distance measurements into an eccentricity plot. An optional base station may be used to generate the wireless network.

20 Claims, 18 Drawing Sheets

(51) Int. Cl.
*G01B 21/24* (2006.01)
*G01B 11/26* (2006.01)
*G01B 7/28* (2006.01)
*G01B 15/00* (2006.01)
*G01B 11/24* (2006.01)

(56) References Cited

U.S. PATENT DOCUMENTS

| | | | |
|---|---|---|---|
| 5,432,339 A * | 7/1995 | Gordon | G01D 5/24452 250/231.13 |
| 6,224,332 B1 | 5/2001 | Leach et al. | |
| 6,839,979 B1 | 1/2005 | Godbole et al. | |
| 7,081,606 B2 | 7/2006 | Osaragi et al. | |
| 7,215,129 B1 * | 5/2007 | Andarawis | F01D 21/003 324/661 |
| 7,554,324 B2 * | 6/2009 | Gualtieri | F01D 17/02 324/207.16 |
| 7,579,844 B2 | 8/2009 | Ducheminsky et al. | |
| 7,722,310 B2 * | 5/2010 | Balasubramaniam | G01B 7/14 324/545 |
| 7,836,772 B2 | 11/2010 | Twerdochlib | |
| 8,023,269 B2 | 9/2011 | Mitchell et al. | |
| 8,092,080 B2 | 1/2012 | Mitchell et al. | |
| 8,220,990 B2 | 7/2012 | Mitchell et al. | |
| 8,223,036 B2 | 7/2012 | Mitchell et al. | |
| 8,400,501 B2 | 3/2013 | Heyworth et al. | |
| 8,519,866 B2 | 8/2013 | Mitchell et al. | |
| 8,525,036 B2 | 9/2013 | Mitchell et al. | |
| 8,527,241 B2 | 9/2013 | Mitchell et al. | |
| 8,599,082 B2 | 12/2013 | Mitchell et al. | |
| 8,629,783 B2 | 1/2014 | Mitchell et al. | |
| 8,797,179 B2 | 8/2014 | Subramanian et al. | |
| 9,068,906 B2 | 6/2015 | Silieti et al. | |
| 9,071,888 B2 | 6/2015 | Subramanian et al. | |
| 9,206,672 B2 | 12/2015 | Cooley et al. | |
| 9,250,153 B2 | 2/2016 | Prabhu et al. | |
| 9,325,388 B2 | 4/2016 | Bevly et al. | |
| 9,476,318 B2 | 10/2016 | Datchanamoorthy et al. | |
| 9,513,117 B2 | 12/2016 | Ruhge et al. | |
| 9,587,511 B2 | 3/2017 | Willett et al. | |
| 2006/0196065 A1 * | 9/2006 | Bankestrom | G01B 21/30 33/550 |
| 2006/0239813 A1 * | 10/2006 | Shah | F01D 11/08 415/119 |
| 2008/0097646 A1 | 4/2008 | Ramsey et al. | |
| 2010/0077830 A1 * | 4/2010 | Andarawis | G01B 21/042 73/1.79 |
| 2011/0231171 A1 * | 9/2011 | Jousselin | G06F 17/5009 703/7 |
| 2014/0014052 A1 * | 1/2014 | Tadokoro | F01L 1/344 123/90.15 |
| 2014/0289299 A1 | 9/2014 | Valente | |
| 2016/0363127 A1 * | 12/2016 | Lee | F04D 27/001 |
| 2019/0195084 A1 * | 6/2019 | Lipstein | F01D 21/003 |

FOREIGN PATENT DOCUMENTS

| | | |
|---|---|---|
| JP | 2005208052 A | 8/2005 |
| KR | 20150066848 A | 6/2015 |

* cited by examiner

# SYSTEM AND METHOD FOR MEASURING ECCENTRICITY OF GAS TURBINE CASING RELATIVE TO ROTOR

TECHNICAL FIELD

The disclosure relates generally to gas turbines having a gas turbine casing or shell, and more particularly, to a system and a method for measuring the eccentricity of the gas turbine casing in relation to the rotor.

BACKGROUND

Some conventional turbo machines, such as gas turbine systems, are utilized to generate electrical power. In general, gas turbine systems include a compressor, one or more combustors, and a turbine. Air may be drawn into a compressor, via its inlet, where the air is compressed by passing through multiple stages of rotating blades and stationary nozzles. The compressed air is directed to the one or more combustors, where fuel is introduced, and a fuel/air mixture is ignited and burned to form combustion products. The combustion products function as the operational fluid of the turbine.

The operational fluid then flows through a fluid flow path that is defined between a plurality of rotating blades and a plurality of stationary nozzles disposed between the rotating blades, such that each set of rotating blades and each corresponding set of stationary nozzles defines a turbine stage. Some turbines used for electrical power generation may have three stages, while others may have four stages. As the plurality of rotating blades rotate the rotor of the gas turbine system, a generator, coupled to the rotor, may generate power from the rotation of the rotor. The rotation of the turbine blades also causes rotation of the compressor blades, which are coupled to the rotor.

Ensuring proper alignment of the gas turbine rotor to the gas turbine casing allows the gas turbine to operate most efficiently, reduces the likelihood of compressor blade tips rubbing on the compressor casing or turbine blades rubbing on the turbine shell, and reduces the likelihood of uneven part wear that may result from uneven air flows through the gas turbine. The alignment process is performed during initial build or installation of the gas turbine and may also be performed during outages in which the gas turbine casing and/or rotor have been moved. The ability to the operator of the gas turbine to correct misalignment and/or undesirable clearances between the rotating compressor or turbine blades and the respective portion of the gas turbine casing ensures operational efficiency and preserves power generation output.

A system is needed for quickly and accurately measuring the eccentricity of the gas turbine casing relative to the rotor at one or more axially spaced stages.

SUMMARY

Briefly, the present disclosure is directed to a system and method for determining eccentricity of a casing and a rotor of a gas turbine. The system includes a plurality of stationary distance detectors coupled to the casing at known circumferential positions and a rotating distance detector coupled to the rotor or a blade in an axial plane defined by the stationary distance detectors. The stationary distance detectors transmit wireless signals to one another to determine a first series of distance measurements between each pair of stationary distance detectors. The rotating distance detector transmits wireless signals to each of the stationary distance detectors, as the rotor is spun, to generate a second series of distance measurements. The measurements are transmitted, over a wireless local area network, to a remote computing device that processes the distance measurements into an eccentricity plot. An optional base station may be used to generate the wireless network.

More specifically, the system for determining eccentricity of a casing relative to a rotor of a gas turbine includes a set of stationary distance detectors installed on the casing at known circumferential positions along a first axial plane, the set of stationary distance detectors comprising a first distance detector, a second distance detector, a third distance detector, a rotating distance detector, and a remote computing device. The first distance detector includes a first housing, a first microcontroller contained within the first housing, a first antenna coupled to the first housing, and a first wireless network transceiver coupled to a distal end of the first antenna. The second distance detector includes a second housing, a second microcontroller disposed within the second housing, a second antenna coupled to the second housing, and a second wireless network transceiver coupled to a distal end of the second antenna. The third distance detector includes a third housing, a third microcontroller disposed within the third housing, a third antenna coupled to the third housing, and a third wireless network transceiver coupled to a distal end of the third antenna. The rotating distance detector, which is affixed to a rotating component of the gas turbine in or near the first axial plane, includes a fourth housing, a fourth microcontroller disposed within the fourth housing, and a fourth wireless network transceiver coupled to the fourth microcontroller. The rotating component is one of the rotor, a compressor blade, and a turbine blade. The first distance detector transmits a first wireless signal to the second distance detector and receives a second wireless signal from the second distance detector to measure a first distance between the first distance detector and the second distance detector. The first distance detector transmits a third wireless signal to the third distance detector and receives a fourth wireless signal from the third distance detector to measure a second distance between the first distance detector and the third distance detector. As the compressor rotor spins, the rotating distance detector transmits a series of fifth wireless signals to the first distance detector, the second distance detector, and the third distance detector, thereby defining a series of path lengths indicative of respective third distances between the fourth distance detector and each of the first distance detector, the second distance detector, and the third distance detector. One or more of the first distance detector and the rotating distance detector transmits measurements of the first distance, the second distance, and the respective third distances. The remote computing device processes the measurements of the first distance, the second distance, and the respective third distances into an eccentricity plot of the casing relative to the rotor at the first axial plane.

A method for determining eccentricity of a compressor casing relative to a compressor rotor of a gas turbine is also provided herein. The method includes the steps of: (a) installing on the casing, in known circumferential positions along a first axial plane, a set of stationary distance detectors comprising a first distance detector, a second distance detector, and a third distance detector, wherein each of the first distance detector, the second distance detector, and the third distance detector comprises a housing, a microcontroller disposed within the housing, an antenna coupled to the housing, and a wireless network transceiver coupled to a distal end of the antenna; (b) installing on a rotating component, in or near the first axial plane, a rotating distance detector, the rotating distance detector comprising a housing, a microcontroller disposed within the housing, and a wireless network transceiver, the rotating component comprising one of a compressor blade and the compressor rotor; (c) taking a first series of measurements of respective distances between respective pairs of the first distance detector, the second distance detector, and the third distance detector by transmitting and receiving wireless signals, over a wireless local area network, among the first distance detector, the second distance detector, and the third distance detector; (d) taking a second series of measurements of respective distances between the rotating distance detector and each of the first distance detector, the second distance detector, and the third distance detector, by transmitting and receiving wireless signals, over the wireless local area network, among the first distance detector, the second distance detector, and the third distance detector, as the compressor rotor is spun at a slow speed; (e) transmitting the first series of measurements and the second series of measurements to a remote computing device, the remote computing device performing calculations and generating an eccentricity plot for the first axial stage; and (f) delivering the eccentricity plot for the first axial stage to a remote viewing device for review to determine if the eccentricity is within a predetermined specification.

BRIEF DESCRIPTION OF THE DRAWINGS

The specification, directed to one of ordinary skill in the art, sets forth a full and enabling disclosure of the present system and method, including the best mode of using the same. The specification refers to the appended figures, in which.

DETAILED DESCRIPTION

To clearly describe the current eccentricity measurement system, certain terminology will be used to refer to and describe relevant machine components within the scope of this disclosure. To the extent possible, common industry terminology will be used and employed in a manner consistent with the accepted meaning of the terms. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, as described below. As used herein, "downstream" and "upstream" are terms that indicate a direction relative to the flow of a fluid, such as the working fluid through the turbine engine. The term "downstream" corresponds to the direction of flow of the fluid, and the term "upstream" refers to the direction opposite to the flow (i.e., the direction from which the fluid flows). The terms "forward" and "aft," without any further specificity, refer to relative position, with "forward" being used to describe components or surfaces located toward the front (or compressor) end of the engine, and "aft" being used to describe components located toward the rearward (or turbine) end of the engine. Additionally, the terms "leading" and "trailing" may be used and/or understood as being similar in description as the terms "forward" and "aft," respectively. "Leading" may be used to describe, for example, a surface of a turbine blade over which a fluid initially flows, and "trailing" may be used to describe a surface of the turbine blade over which the fluid finally flows.

Figure 1:
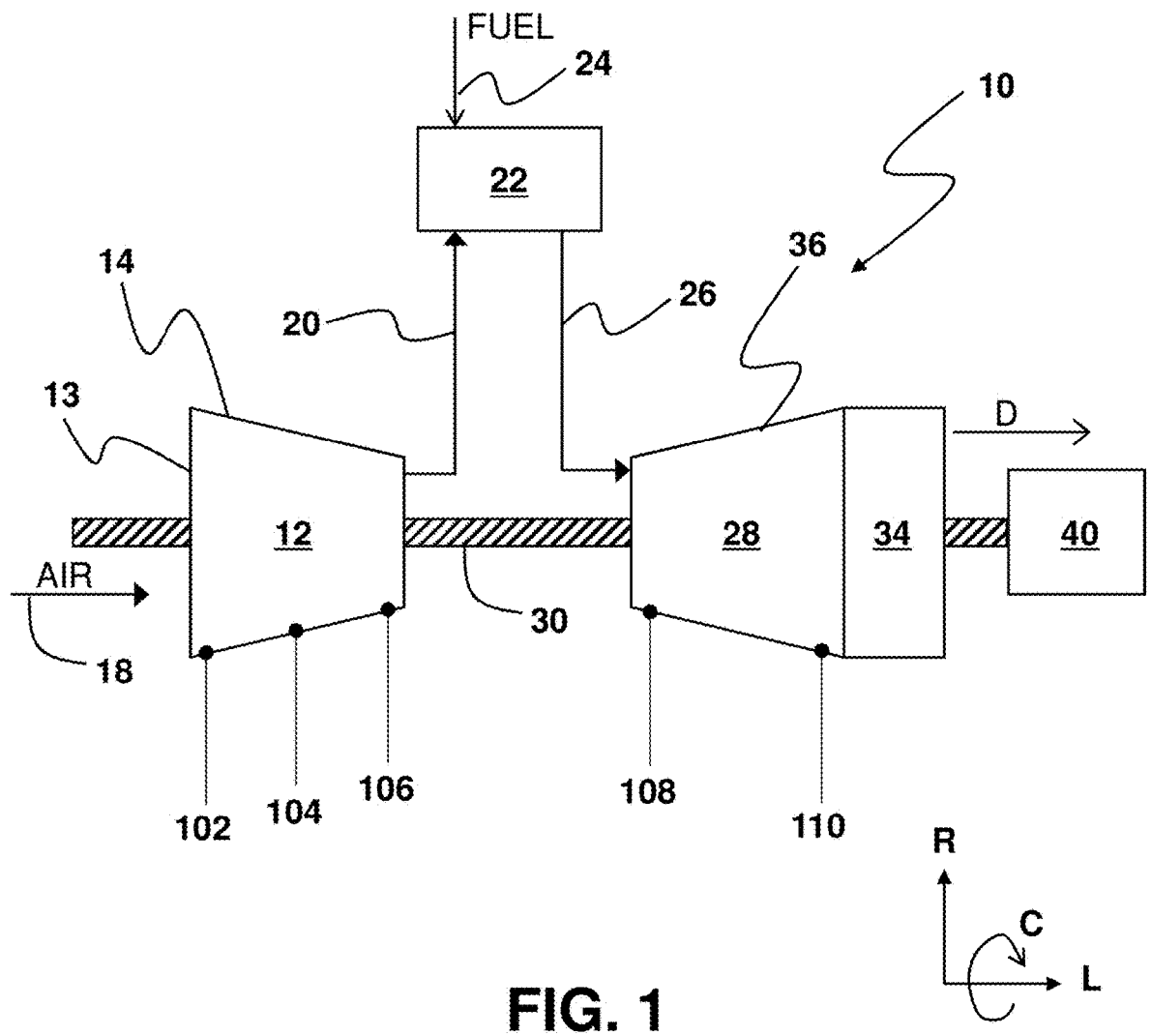
FIG. 1 is a schematic diagram of a gas turbine system in which the present eccentricity measurement system may be employed.

It is often required to describe parts that are at differing radial, axial and/or circumferential positions. As shown in FIG. 1, the "A" axis represents an axial orientation. As used herein, the terms "axial" and/or "axially" refer to the relative position/direction of objects along axis A, which is substantially parallel with the axis of rotation of the turbine system (in particular, the rotor section). As further used herein, the terms "radial" and/or "radially" refer to the relative position or direction of objects along an axis "R", which is substantially perpendicular with axis A and intersects axis A at only one location. Finally, the term "circumferential" refers to movement or position around axis A (e.g., axis "C"). The term "circumferential" may refer to a dimension extending around a center of any suitable shape (e.g., a polygon) and is not limited to a dimension extending around a center of a circular shape.

The disclosure relates generally to gas turbines having a compressor casing and a turbine shell, and more particularly, to a system and method for measuring the eccentricity of either or both the compressor casing and the turbine shell in relation to the gas turbine rotor. Such measurements may be necessary during manufacturing and during outages, when the gas turbine is inactive (e.g., during an inspection or maintenance period). Any reference made herein to "a casing" or "the casing" should be read to encompass either the compressor casing or the turbine shell, unless specific context dictates otherwise. The casing may be a single wall casing or a double-wall casing, and it is not required that both the compressor casing and the turbine shell include the same number of walls. Reference herein to a "rotating blade" should be understood as referring to either a compressor blade or a turbine blade, unless specific context dictates otherwise.

Various embodiments of the system and method are discussed below with reference to FIGS. 1-22. However, those skilled in the art will readily appreciate that the detailed description given herein with respect to these Figures is for explanatory purposes only and should not be construed as limiting.

FIG. 1 shows a schematic view of an exemplary gas turbine system 10. The gas turbine system 10 may include a compressor 12, which includes a plurality of rotating blades 16 (shown in FIG. 16) and stationary vanes arranged in stages within a compressor casing 14. Air 18 enters the compressor inlet 13 and flows through multiple stages of blades and vanes, producing a compressed air flow 20. The compressor 12 delivers the flow of compressed air 20 to a combustor 22. Within the combustor 22, the flow of compressed air 20 is mixed with a flow of fuel 24, with the resulting mixture being burned to create a flow of combustion gases 26. Although only a single combustor 22 is shown, the gas turbine system 10 may include any number of combustors 22.

Figure 17:
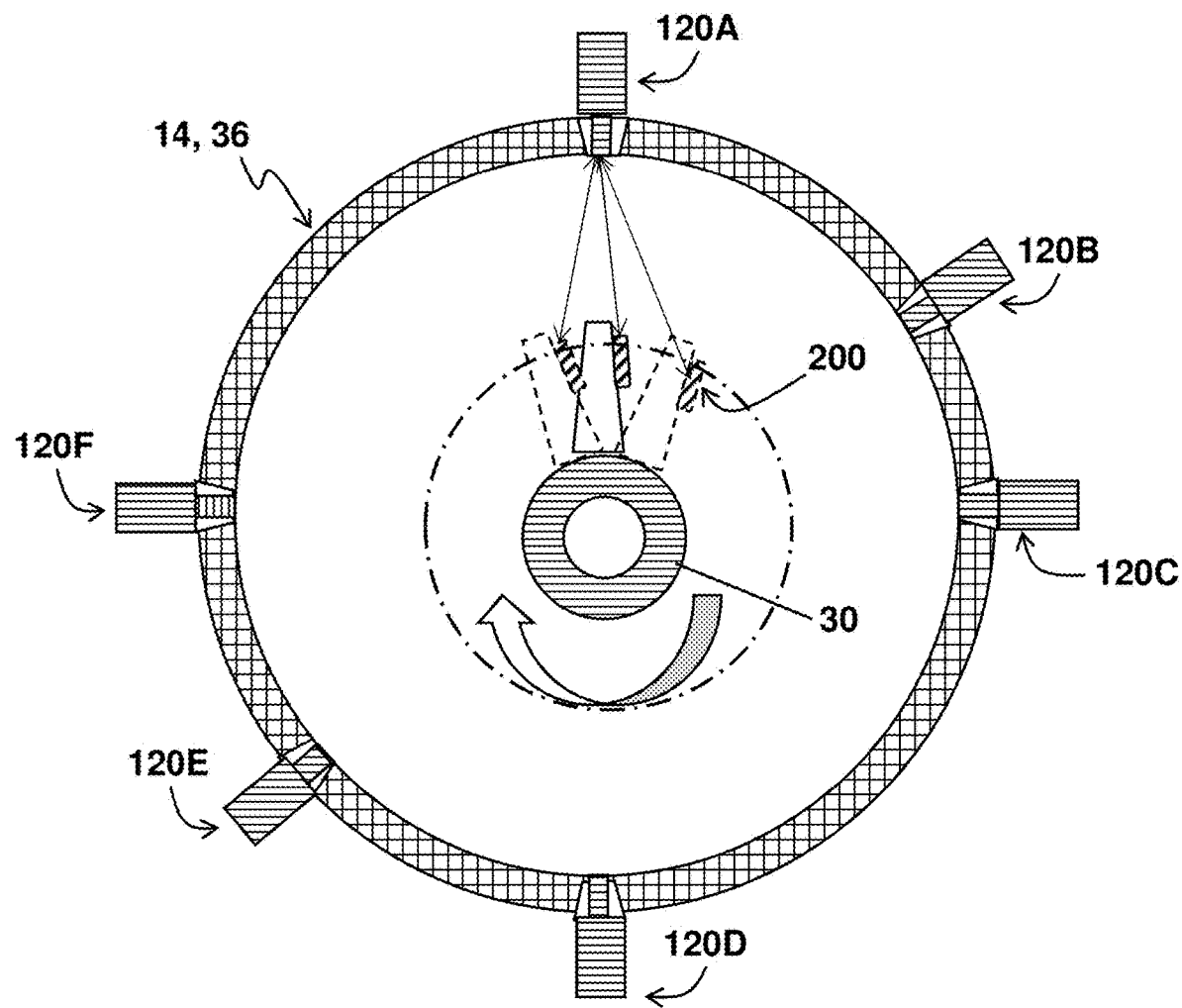
FIG. 17 is a schematic depiction of wireless communication between one of the stationary distance detectors (of FIG. 3) and the rotating distance detector (of FIG. 13), illustrating the rotating distance detector mounted to the rotating blade of FIG. 16.

The flow of combustion gases 26 is, in turn, delivered to a turbine 28, which typically includes a plurality of rotating blades and stationary vanes, also arranged in stages. The flow of combustion gases 26 drives the turbine 28 to produce mechanical work. The mechanical work produced in turbine 28 drives the compressor 12, via a rotor 30 extending through the turbine 28, and may be used to drive an external load 40, such as an electrical generator or the like. The rotor 30 may be a solid rotor or a stacked rotor having a hollow core (e.g., as shown in FIG. 17).

The gas turbine system 10 may also include an exhaust frame 34. As shown in FIG. 1, the exhaust frame 34 may be positioned adjacent to the turbine 28 of the gas turbine system 10. More specifically, the exhaust frame 34 may be positioned adjacent to, and substantially downstream of, the turbine 28. As discussed herein, a portion (e.g., an outer casing) of the exhaust frame 34 may be coupled directly to an enclosure or shell 36 of the turbine 28.

After the combustion gases 26 flow through and drive the turbine 28, the combustion gases 26 may be exhausted, flow through, and/or be discharged through the exhaust frame 34 in a flow direction (D). In the non-limiting example shown in FIG. 1, the combustion gases 26 may flow through the exhaust frame 34 in the flow direction (D) and may be discharged from the gas turbine system 10 (e.g., to the atmosphere). In another non-limiting example where the gas turbine system 10 is part of a combined cycle power plant (e.g., a plant including the gas turbine system and a steam turbine system), the combustion gases 26 may discharge from the exhaust frame 34 and may flow in the flow direction (D) into a heat recovery steam generator of the combined cycle power plant.

Figure 2:
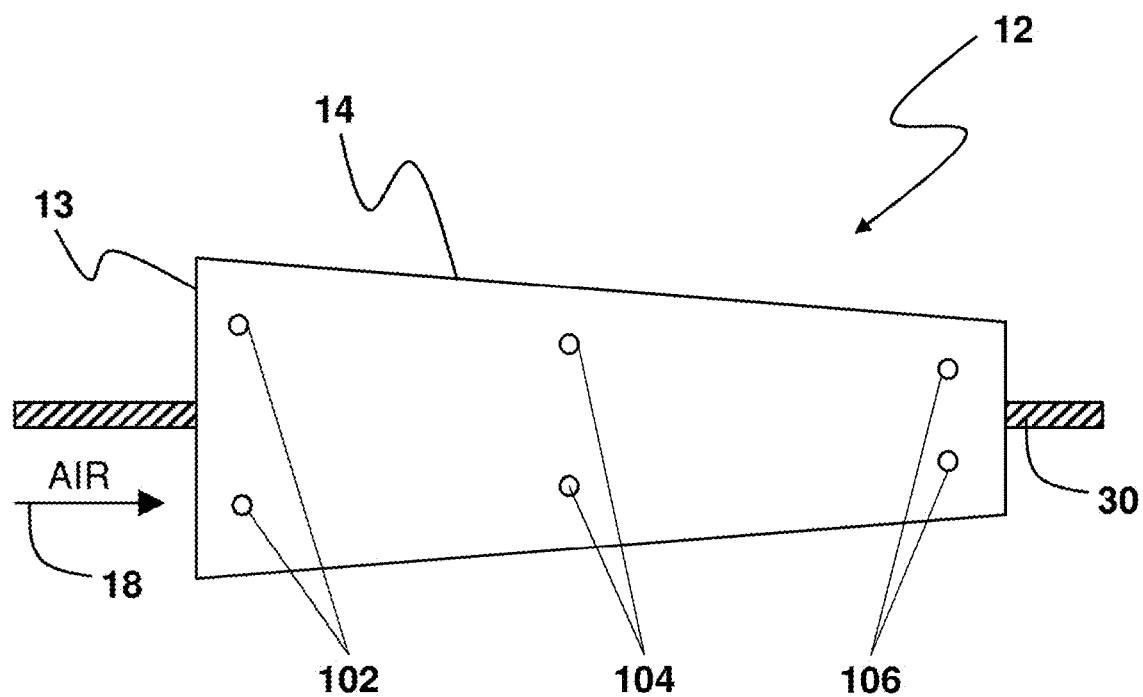
FIG. 2 is a schematic diagram of a compressor of the gas turbine system of FIG. 1, illustrating casing penetrations at different compressor stages.

Turning to FIG. 2, and with continued reference to FIG. 1, a portion of the gas turbine system 10 is shown. Specifically, FIG. 2 schematically illustrates the compressor section 12 and its casing 14. As described above, air 18 enters through the inlet 13 at an upstream end of the compressor 12 and encounters a first stage of rotating compressor blades and a first stage of stationary vanes coupled to the interior of the compressor casing 14. As further discussed herein, the rotor 30 may include the plurality of blades 16 coupled to and positioned circumferentially around the rotor 30 (one of which is shown in FIG. 17), and the rotation of the rotor 30 may be driven by the rotating blades in the turbine section 28. Each blade 16 of the compressor section 12 may include an airfoil extending radially from the rotor 30 and positioned within the flow path of the air 18 flowing through the compressor section 12.

The compressor casing 14 includes casing penetrations 102, 104, 106 (i.e., holes through the casing 14) to facilitate entry of inspection tools, such as borescopes. In the exemplary arrangement illustrated, the casing penetrations 102 are disposed at or near the inlet 13 of the compressor 12, the casing penetrations 104 are disposed near the mid-stages of the compressor 12, and the casing penetrations 106 are disposed at or near the aft (or outlet) end of the compressor 12.

Similar casing penetrations 108, 110 (as shown in FIG. 1) may be defined through the turbine shell 36 that surrounds the turbine 28 at or near the inlet of the turbine 28 and at or near the aft (or outlet) end of the turbine 28, respectively. While only two sets of casing penetrations are described, it should be understood that each stage of the turbine 28 may have its own set of casing penetrations.

In each stage, whether in the compressor casing 14 or the turbine shell 36, the casing penetrations are disposed along a common axial plane. In some instances, the casing penetrations in a single stage (e.g., casing penetrations 102) may be arranged with equidistant circumferential spacing between adjacent casing penetrations 102. In some cases, the casing penetrations in a single stage are positioned with at least one casing penetration per quadrant of the 360-degree casing 14, regardless of whether the circumferential spacing is equidistant (at 90-degree intervals) or uneven. In other instances, pairs of adjacent casing penetrations in a single stage may be spaced unevenly in the circumferential direction to accommodate other hardware outside the casing 14. The present eccentricity measurement system 1000 does not require uniform, or equidistant, circumferential spacing between the casing penetrations in a given axial plane (e.g., in any of casing penetrations 102, 104, 106, 108, or 110) to collect the measurements described herein.

Figure 3:
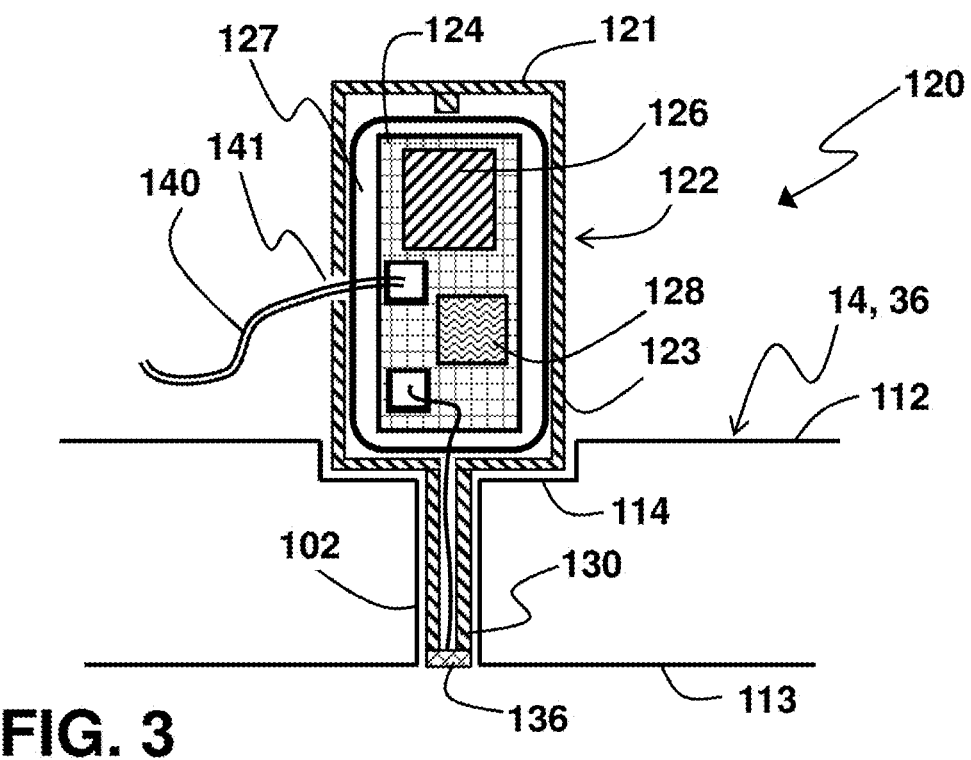
FIG. 3 is a side cross-sectional view of a stationary distance detector, which may be used as part of an eccentricity measurement system of the present disclosure.
Figure 4:
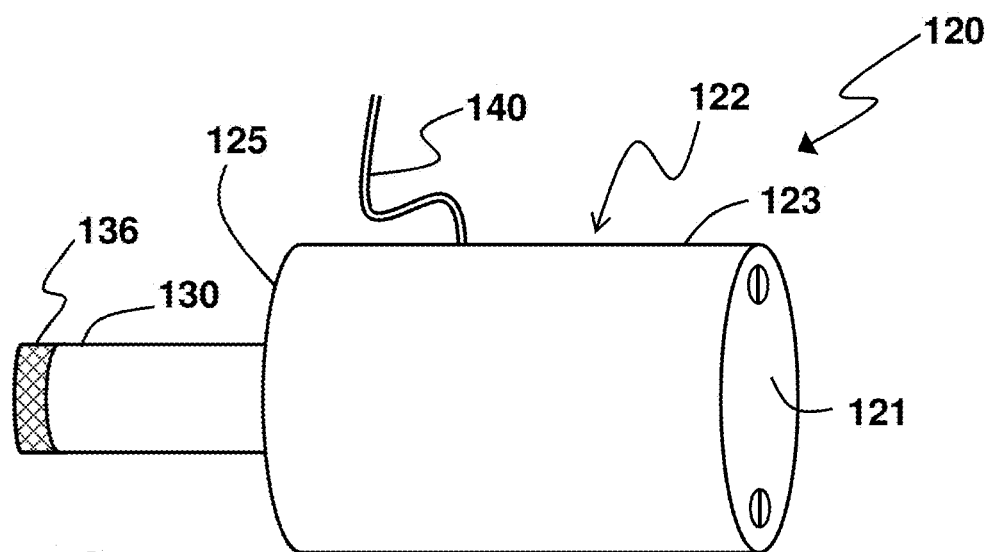
FIG. 4 is a side perspective view of the stationary distance detector of FIG. 3.

FIGS. 3, 4, 5, and 6 provide various views of a stationary distance detector 120, which is part of the present eccentricity measurement system. The stationary distance detector 120 is configured for installation through a respective casing penetration 102, 104, or 106 in the compressor casing 14 or a casing penetration 108 or 110 in the turbine shell 36. As shown in FIG. 3, the radially outer surface 112 of the casing 14 or 36 may be provided with a countersunk, or recessed, region 114 to provide a smooth surface for installation of the distance detector 120 (or other instruments). The casing penetration (e.g., 102) extends radially inward through the casing 14 or 36 from the countersunk region 114 to a radially inward surface 113 of the casing 14 or 36.

The distance detector 120, which may be referred to as a casing-mounted or stationary distance detector, includes a housing 122 having a cylindrical main body 123 having a top (radially outer) surface 121 and a bottom (radially inner) surface 125 and an antenna 130 that extends radially outward from the bottom surface 125 of the main body 123. The main body 123 contains a circuit board assembly 124, which may be mounted to a platform 127 to maintain the position of the circuit board assembly 124 within the main body 123. A primary wireless transceiver 126 and a microcontroller 128 are installed on the circuit board assembly 124, along with a pair of electrical connectors (not separately labeled).

Figure 7:
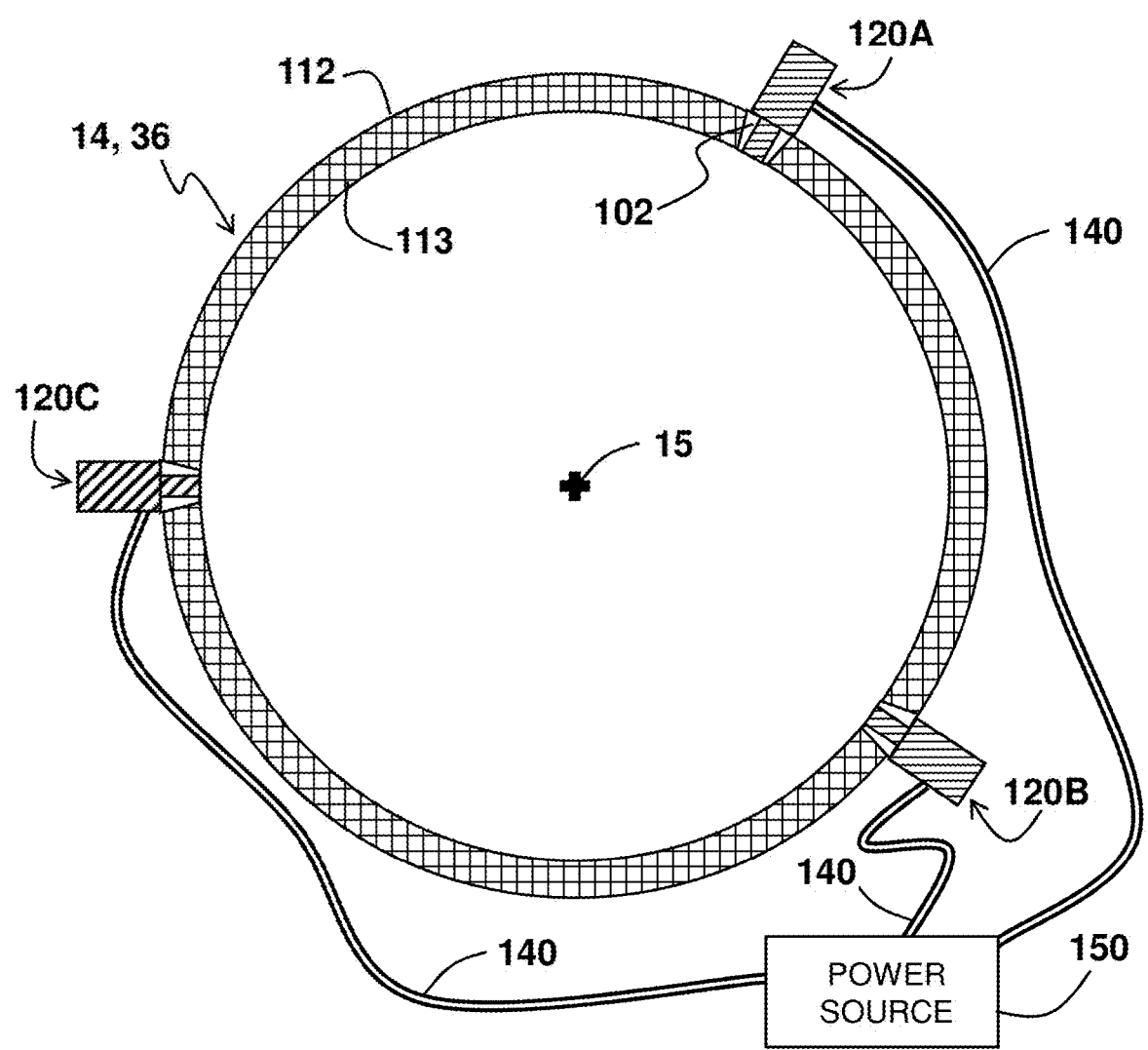
FIG. 7 is a schematic view of a set of stationary distance detectors, as installed around a casing of either the compressor or the turbine of FIG. 1.

The main body 123 of the housing 122 includes an opening 141 through which an electrical power cord 140 is fed. Because the casing-mounted distance detector 120 is stationary, the power source 150 may be remote from the distance detector 120 (as shown in FIG. 7). Alternately, the casing-mounted distance detector 120 may be provided with a power source internal to the main body 123 of the housing 122, such as a battery that connects to the circuit board assembly 124. In such instance (not shown separately), a switch in communication with the power source would be used to turn the distance detector on/off. If desired, the circuit board assembly 124 may be connected to one or more LED lights (not shown) that indicate that the stationary distance detector 120 is turned on or, in the case of a battery-powered detector, that indicate a battery level of the battery.

The antenna 130 has a cylindrical shape configured to fit within the casing penetration 102, 104, or 106 in the compressor casing 14 or the casing penetration 108 or 110 in the turbine shell 36. The antenna 130 includes a secondary wireless transceiver 136 at an end distal to the main body 123 of the housing 122. The antenna 130 has a length that permits the transceiver 136 to be flush with the radially inward surface 113 of the casing 14 or 36, so that the antenna 130 is not disrupted by the rotation of the compressor blades 16 or turbine blades, respectively, as occurs later in the eccentricity measurement process.

Figure 10:
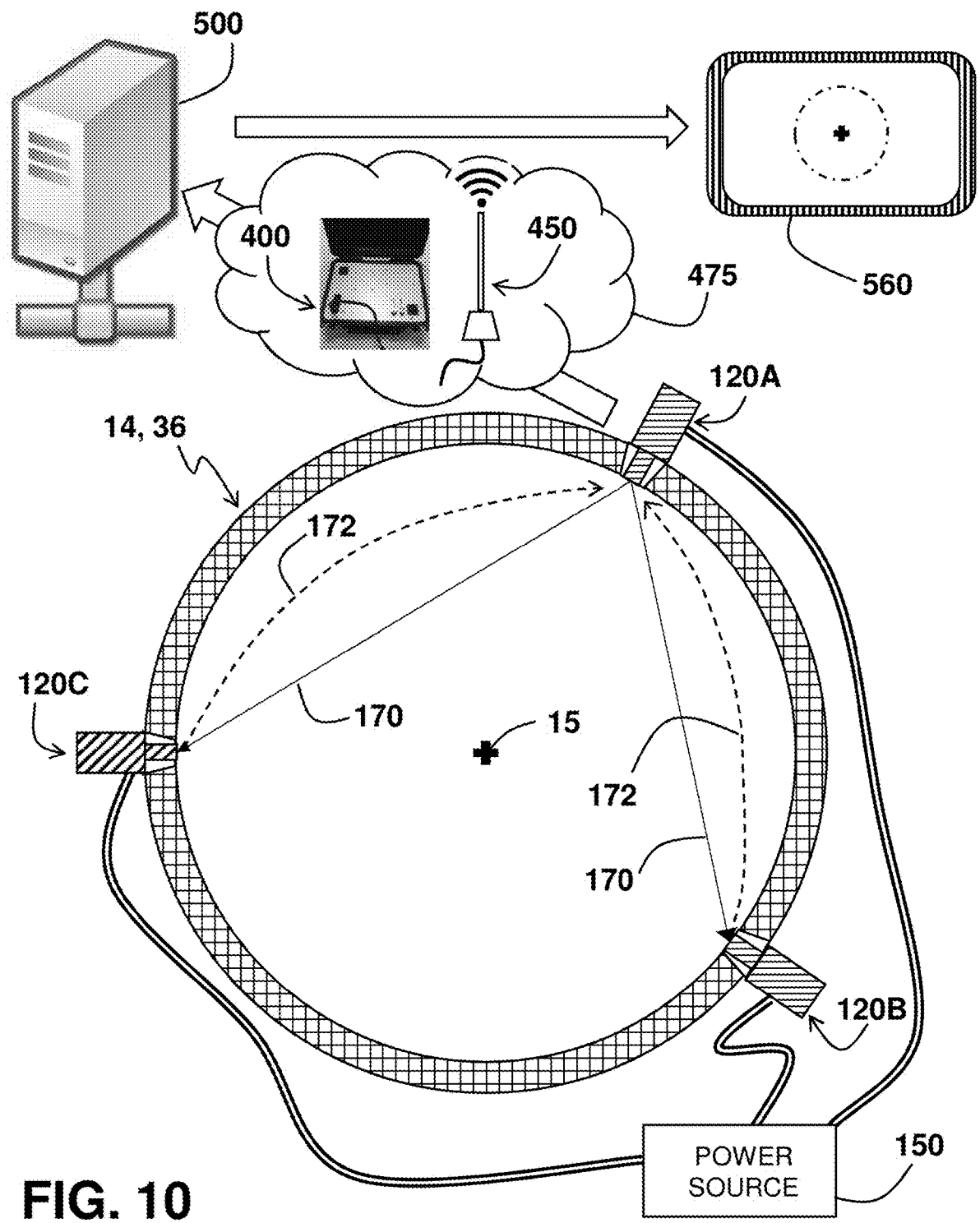
FIG. 10 is a schematic depiction of wireless communication between the stationary distance detectors of the present eccentricity measurement system and a remote computing device.

Data received by the secondary wireless transceiver 136 is transmitted to the microcontroller 128 in the circuit board assembly 124, which causes the primary wireless transceiver 126 to transmit the data to a remote computing device 500 for analysis (as shown in FIG. 10). The microcontroller 140 includes a memory (not separately labeled). The memory of the microcontroller 140 stores the data measurements over a defined measurement period. At the end of the measurement period, the wireless transceiver 126 permits the wireless transmission of (data) signals from the distance detector 126 in a single message delivered to a remote computing device 500, such as a server or computer (as shown in FIG. 10, discussed below). The transmissions may be made over any suitable Wi-Fi network protocol, including, but not limited to, 802.11b, 802.11g, and 802.11n. Although illustrated separately, the wireless transceiver 126 may be integrated with the microcontroller 128 in some embodiments.

Figure 5:
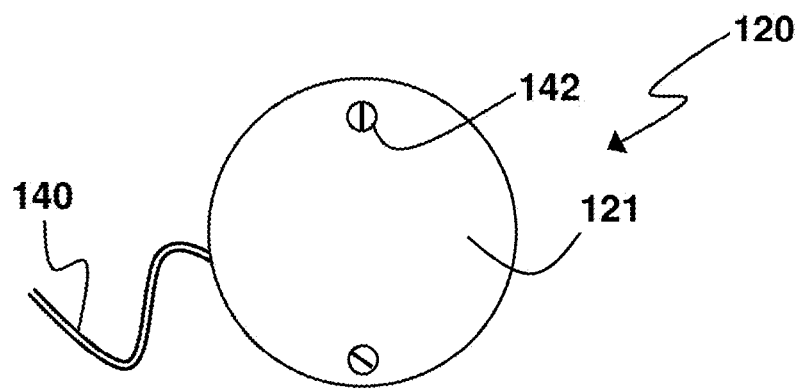
FIG. 5 is an overhead plan view of the stationary distance detector of FIG. 3.
Figure 6:
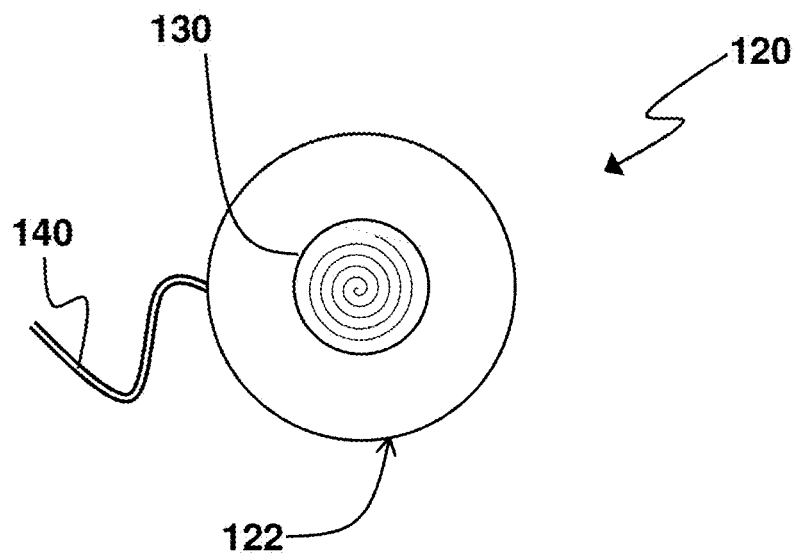
FIG. 6 is a bottom plan view of the stationary distance detector of FIG. 3.

FIG. 5 illustrates the stationary distance detector 120, as viewed from the top surface 121. The top surface 121 of the housing 122 may be removeable from the housing 122 for accessing the interior thereof. As shown in FIG. 5, screws 142 or other attachment means may be used to connect the top surface 121 to the housing 122. FIG. 6 illustrates the stationary distance detector 120, as viewed from the bottom, showing the bottom surface 125 and the wireless transceiver 136 of the antenna 130.

The housing 122 and the antenna 130 may be manufactured of plastic using additive manufacturing techniques, such as three-dimensional printing, as a unified (single) component or as two separate components that are later coupled together. Alternately, the housing 122 and/or the antenna 130 may be manufactured by molding, casting, or other suitable techniques.

FIG. 7 illustrates an exemplary arrangement of stationary distance detectors 120 on the compressor casing 14 or the turbine shell 36. To facilitate discussion, the stationary distance detectors 120 are given an additional alphabetic designation, as "120A", "120B", and "120C." The casing 14 (or the shell 36) has a geographic center 15, which is indicated by a plus-sign.

The stationary distance detectors 120 are arranged in a common axial plane through respective casing penetrations 102 (or 104 or 106) in the compressor casing 14 or casing penetrations 108 or 110 in the turbine shell 36 and may be spaced equidistant from one another, although such equivalent spacing is not required. The technician conducting the readings to determine the eccentricity of the gas turbine casing relative to the rotor 30 inputs the relative circumferential positions of each stationary distance detector 120A, 120B, 120C into a computer program (not shown) hosted on a remote computing device 500 (such as a computer or server), or into a smart device application hosted on a remote viewing device 560 (e.g., a tablet computer).

Each stationary distance detector 120A, 120B, 120C may be provided with a respective power cord 140, which connects the distance detector 120A, 120B, 120C to the power source 150. Alternately, each distance detector 120A, 120B, and 120C (etc.) may be provided with its own battery to supply power to the microcontroller 128 and other components.

Figure 8:
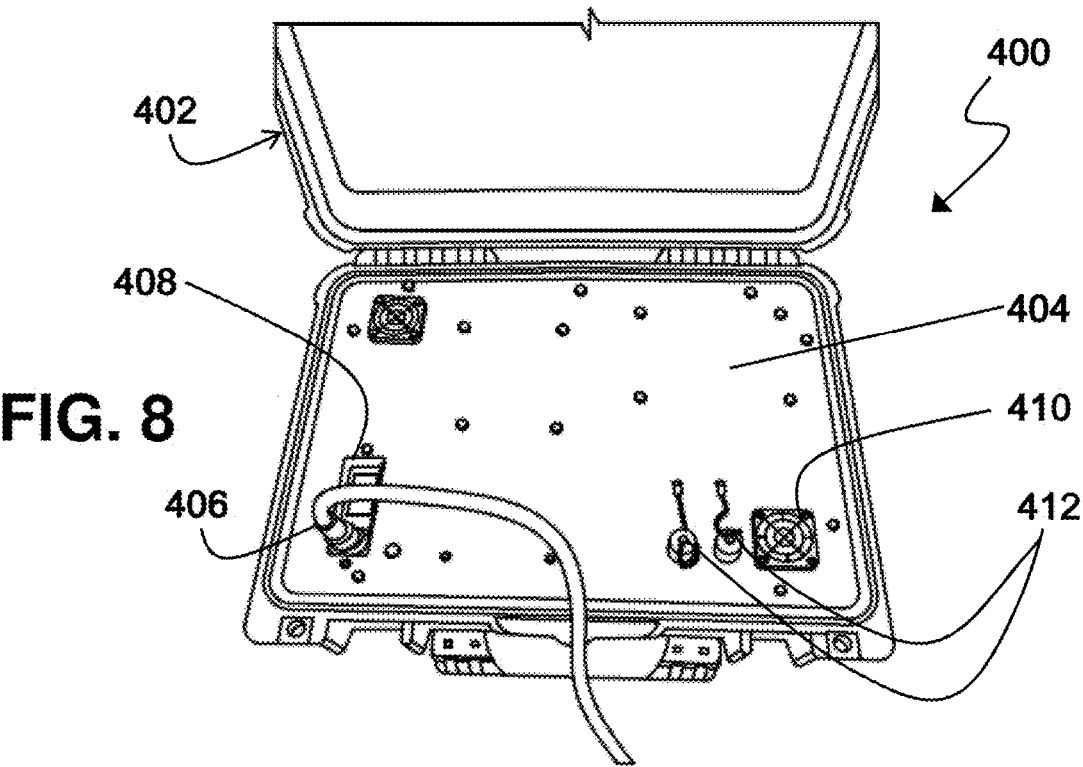
FIG. 8 is an overhead perspective view of a base station that may be used with the present eccentricity measurement system.
Figure 9:
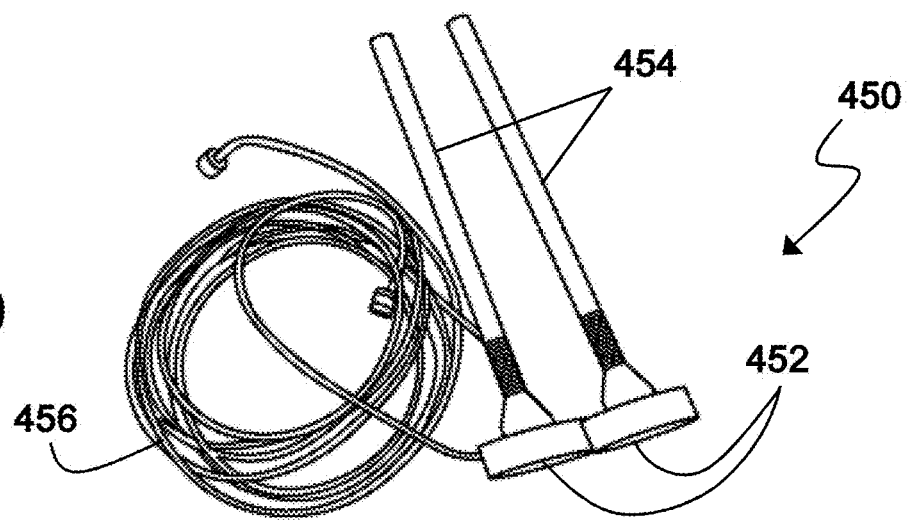
FIG. 9 is a perspective view of a pair of antennas for use with the base station of FIG. 8.

For the stationary distance detectors 120 to transmit data wirelessly to the remote computing device, such as the server 500, and ultimately to a remote viewing device 560 (such as a tablet computer), it is advantageous to employ a wireless local area network (WLAN) 475, as shown in FIG. 10. FIGS. 8 and 9 illustrate components that may be used to create a wireless network, if one is not available, including a base station 400 and a pair of antennas 450 to boost the wireless transmissions from the distance detectors 120. The base station 400, which acts as a wireless router, is housed in a portable storage box 402. A protective shield 404 prevents damage to the circuit boards (not shown) that include a W-Fi chip (wireless transceiver) and a microcontroller. The protective shield 404 includes an electrical outlet 406 and a switch 408. Fans 410 may be used to cool the circuit boards. A pair of antenna ports 412 are also provided.

FIG. 9 shows the antennas 450, each antenna 450 having a circular base 452 and an extended shaft 454. The base 452 may include a magnet to facilitate mounting to the gas turbine system 10. The antennas 450 are connected, via cables 456, to the antenna ports 412 of the base station 400. The antennas 450 may be positioned, for example, on the turbine stand radially outward of the compressor 12 or the turbine 28, depending on the axial stage at which the distance measurements are to be taken. Alternately, or additionally, one or more antennas may be positioned within the casing 14 or 36 or within the exhaust frame 34, depending on the location of the axial plane at which the stationary distance detectors 120 and the rotating distance detector 200 are installed.

FIG. 10 illustrates wireless signal transmission between the stationary distance detector 120A and the stationary distance detectors 120B and 120C. When powered on, the distance detector 120A transmits a wireless signal 170 (generated by the wireless transceiver 136) to the wireless transceiver 136 in the distance detector 120B. Upon receipt of the transmitted wireless signal 170, the wireless transceiver 136 in the distance detector 120B transmits a wireless response signal 172 to the distance detector 120A. The "time-of-flight" between the transmission of the wireless signal 170 and the receipt of the wireless response signal 172 is recorded in the memory of the microcontroller 128 of the distance detector 120A and is used by the remote computing device 500 to calculate the distance between the distance detector 120A and the distance detector 120B. The process is repeated between the distance detector 120A and the distance detector 120C. Optionally, the process is repeated between the distance detector 120B and the distance detector 120C.

The data from the stationary distance detectors 120A, 120B, and/or 120C is transmitted wirelessly, via the antennas 480, using the wireless local area network (WLAN) 475 produced by the base station 400. The data measurements are received by the remote computing device 500, which performs calculations on the measurements to generate a data plot, as discussed below. The remote computing device 500 (i.e., a computer or server) uses MQ telemetry transport (MQTT) messaging protocol, or another suitable messaging protocol, to communicate with an application loaded on the remote viewing device 560, where the results may be reviewed by the technician when the eccentricity measurement process is complete.

Figure 11:
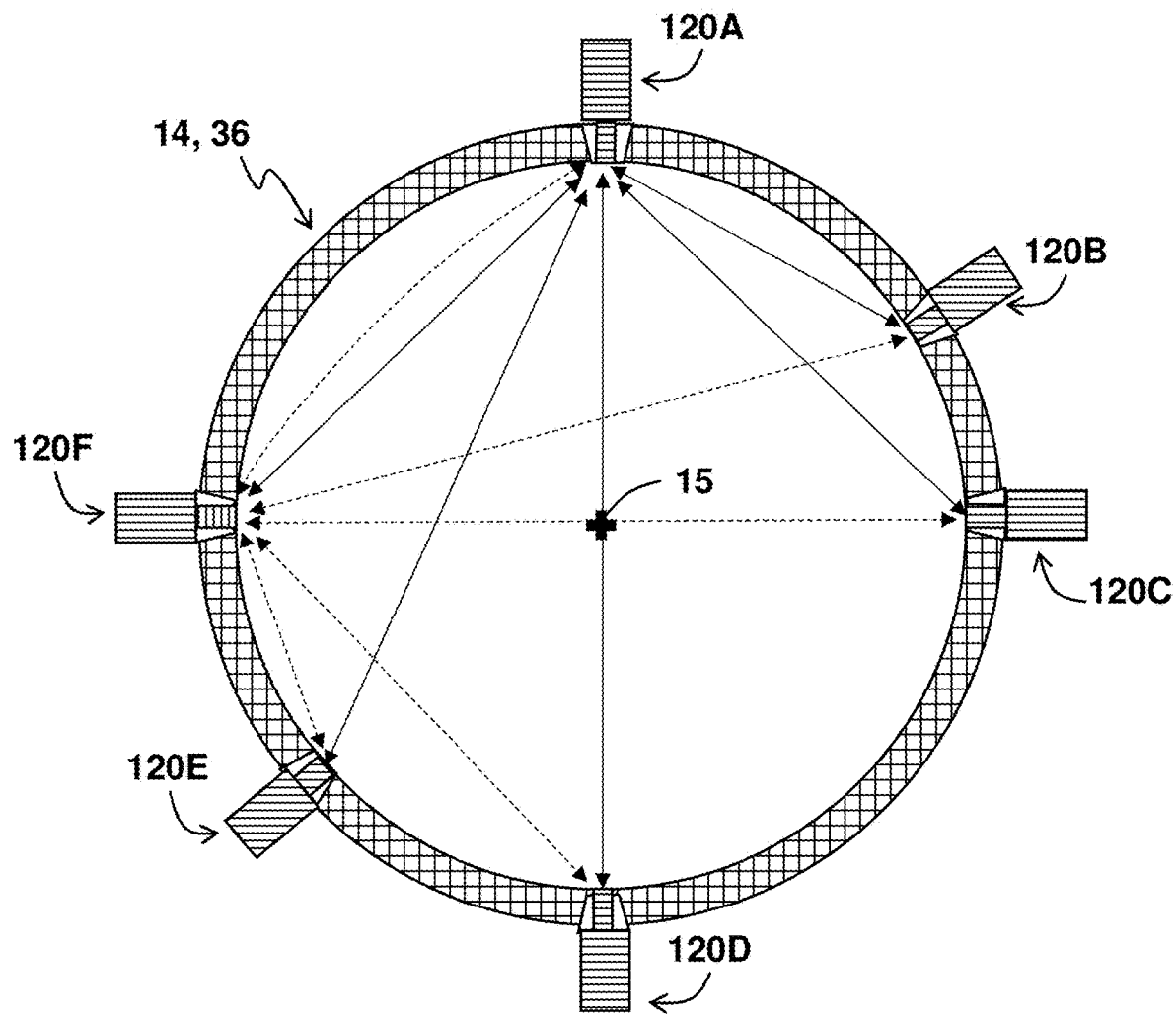
FIG. 11 is a schematic depiction of wireless communication between each of two stationary distance detectors (as in FIG. 3) and a plurality of other stationary distance detectors installed on the casing.

FIG. 11 illustrates the use of more than three stationary distance detectors 120 around the compressor casing 14 or turbine shell 36. In this exemplary arrangement, the stationary distance detectors 120A, 120C, 120D, and 120F are positioned at equidistant circumferential spacing relative to one another, although such even spacing is not required. Distance detectors 120B and 120E are disposed at intermediate positions between respective pairs of distance detectors 120 (i.e., between 120A and 120C for distance detector 120B, and between 120D and 120F for distance detector 120E). In FIG. 11, the stationary distance detector 120A transmits wireless signals to, and receives wireless response signals from, each of the other stationary distance detectors 120B, 120C, 120D, 120E, and 120F. Likewise, as illustrated, stationary distance detector 120F transmits wireless signals to, and receives wireless response signals from, each of the other stationary distance detectors 120A, 120B, 120C, 120D, and 120E.

Figure 12:
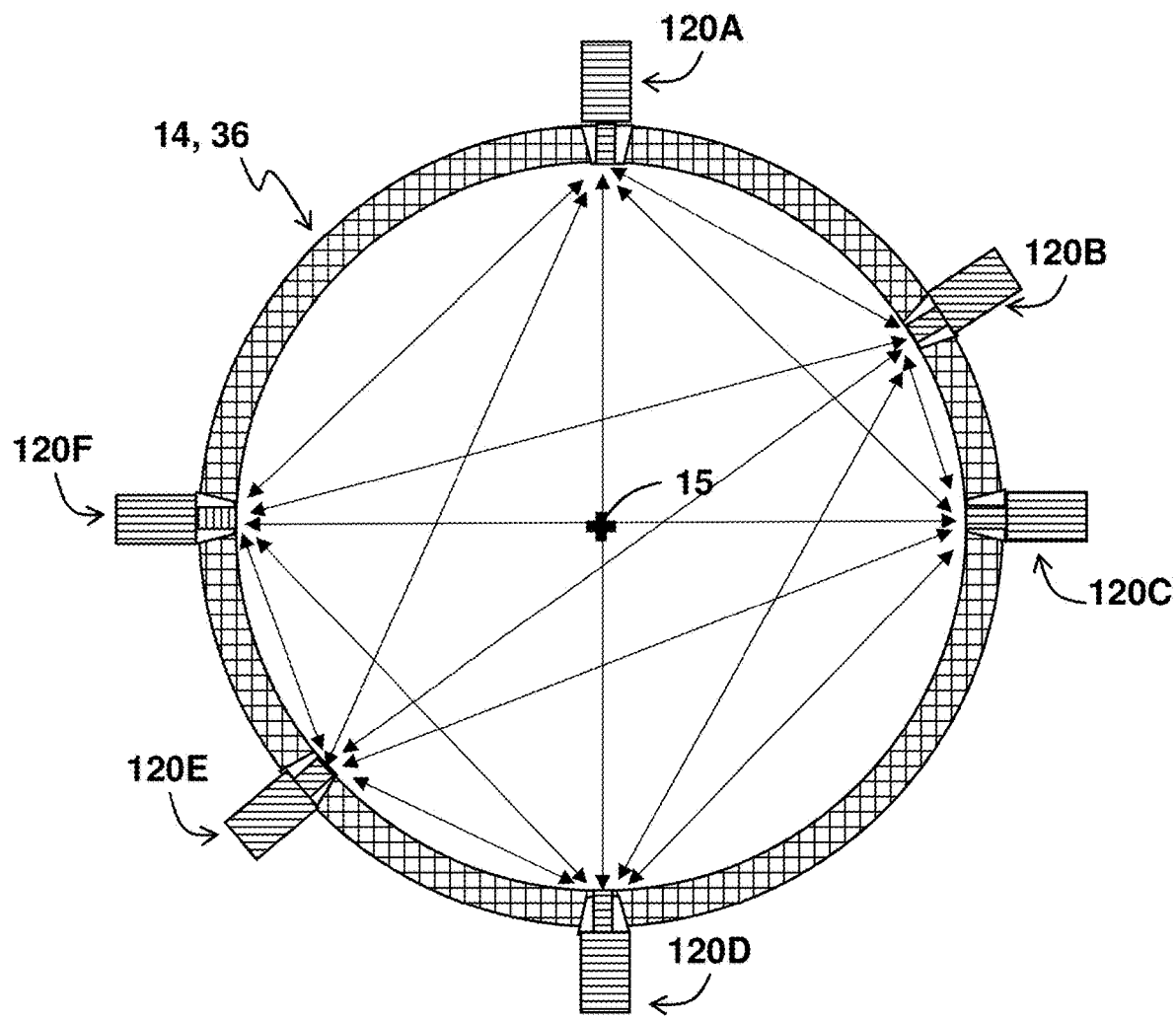
FIG. 12 is a schematic depiction of wireless communication between respective pairs of the stationary distance detectors (as in FIG. 3) of the present eccentricity measurement system.

For better accuracy in determining the center 15 of the compressor casing 14 or the turbine shell 36, each distance detector 120A through 120F transmits and receives wireless signals in a series of respective pairs, as shown in FIG. 12. As the number of stationary distance detectors 120 increases, the number of corresponding distance measurements also increases, according to a formula F1 shown below, where n=the number of distance detectors and M=the number of measurements:

$$(n-1) \times \frac{n}{2} = M \quad [F1]$$

For practical purposes, n should be equal to or greater than 3. Thus, for the arrangement illustrated in FIG. 12 having six stationary distance detectors 120, the resulting communications between respective pairs of the stationary distance detectors will yield 15 distance measurements. The remote computing device 500 (e.g., the server or computer) will use the distance measurements to generate a circle representing the interior surface of the compressor casing 14 or the turbine shell 36 and, from this circle, to determine the center 15 of the casing 14 or shell 36.

Figure 13:
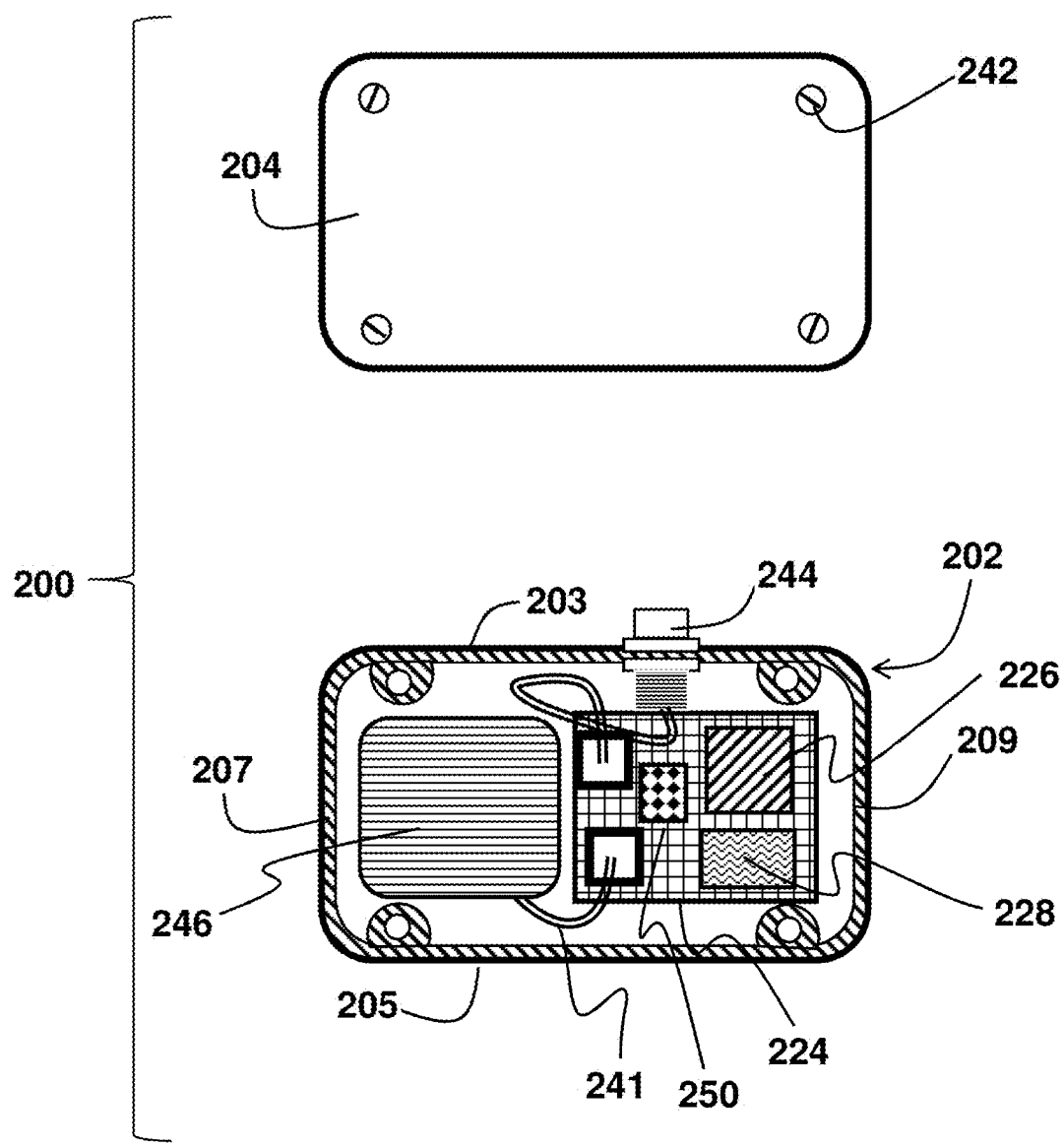
FIG. 13 is an exploded overhead view of a rotating distance detector, as may be mounted to a rotating component of the gas turbine of FIG. 1, as part of the present eccentricity measurement system.
Figure 14:
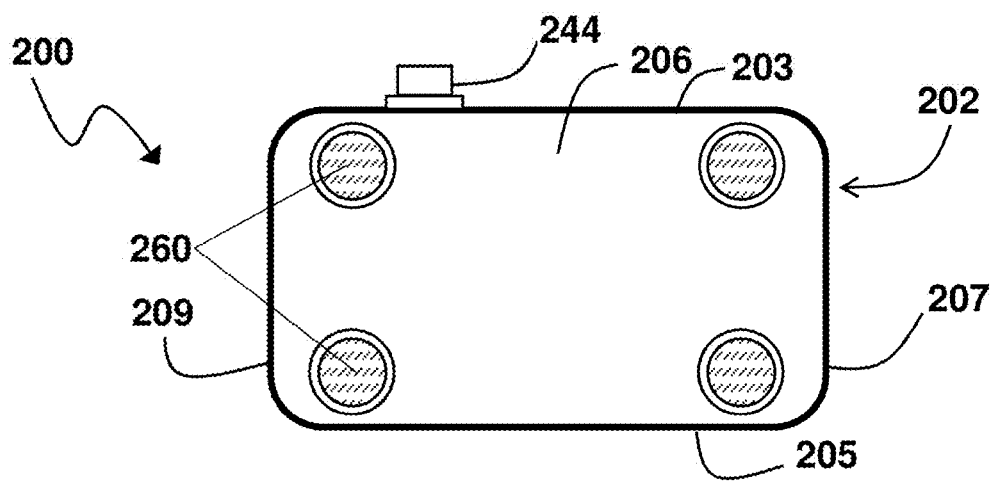
FIG. 14 is a bottom plan view of the rotating distance detector of FIG. 13.
Figure 15:
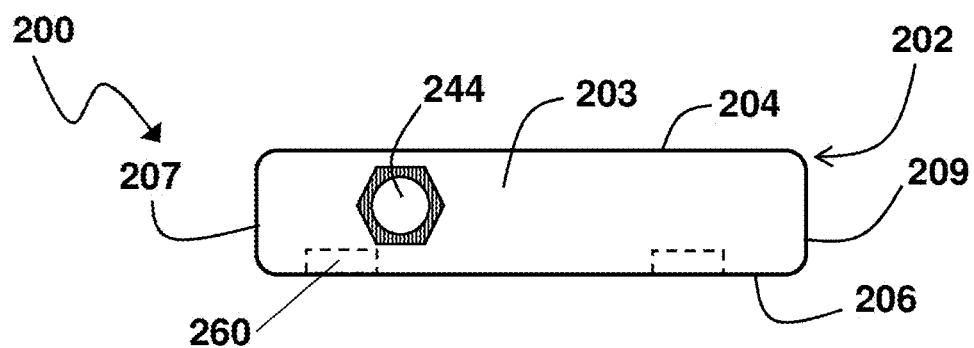
FIG. 15 is a side view of the rotating distance detector of FIG. 13.

FIGS. 13, 14, and 15 provide various views of a second type of distance detector 200, which is mounted to a rotating component (e.g., a compressor rotor 30 or a compressor blade 16) of the compressor 12.

The rotating distance detector 200 includes a housing 202 having a generally rectangular shape and a low profile to fit between adjacent compressor blades 16 or turbine blades. The housing 202 includes a top surface 204, a bottom surface 206 opposite the top surface (see FIG. 14), a pair of oppositely disposed side walls 203, 205 connecting the longer sides of the top surface 204 and the bottom surface 206, and a pair of oppositely disposed end walls 207, 209 connecting the shorter sides of the top surface 204 and the bottom surface 206. When the rotating distance detector 200 is installed on the blade 16 or the rotor 30, the top surface 204 is the surface that is positioned radially outward of the blade 16 or rotor 30, and the bottom surface 206 is the surface that is in contact with, or proximate to, the blade 16 or rotor 30. The top surface 204 of the housing 202 may be removeable from the housing 202 for accessing the interior thereof, as shown in FIG. 13. Screws 242, or other attachment means, may be used to connect the top surface 204 to the housing 202.

The housing 202 contains a circuit board assembly 224 and a battery 246 connected to the circuit board assembly 224, via one or more wires 241. The circuit board assembly 224 includes a microcontroller 228 and a wireless transceiver 226 configured to communicate with the first (casing-mounted) distance detector(s) 120. The circuit board assembly 224 may also include an inclination sensor 250, such as an accelerometer, which continuously determines the angular position of the distance detector 200 relative to gravity. The accelerometer 250 may contain embedded algorithms to filter out non-gravitational effects, such as centripetal acceleration, which allows the present system 1000 to operate over a wide range of rotor speeds.

A power button or switch 244, which is shown positioned on the side wall 203, is wired to the circuit board assembly 224. The position of the power button 244 may be varied according to design preferences, and the illustrated position on the side wall 203 is merely exemplary. When the power button or switch 210 is activated, the microcontroller 228 draws electrical power from the battery 246.

The battery 246 may be a rechargeable battery, which may be recharged via a USB port (not shown) disposed in a side wall 203, 205 or an end wall 207, 209. If desired, the circuit board 224 may include one or more LED lights (not shown) connected thereto, which indicate that the rotating distance detector 200 is turned on or that indicate a battery level of the battery 246.

Figure 16:
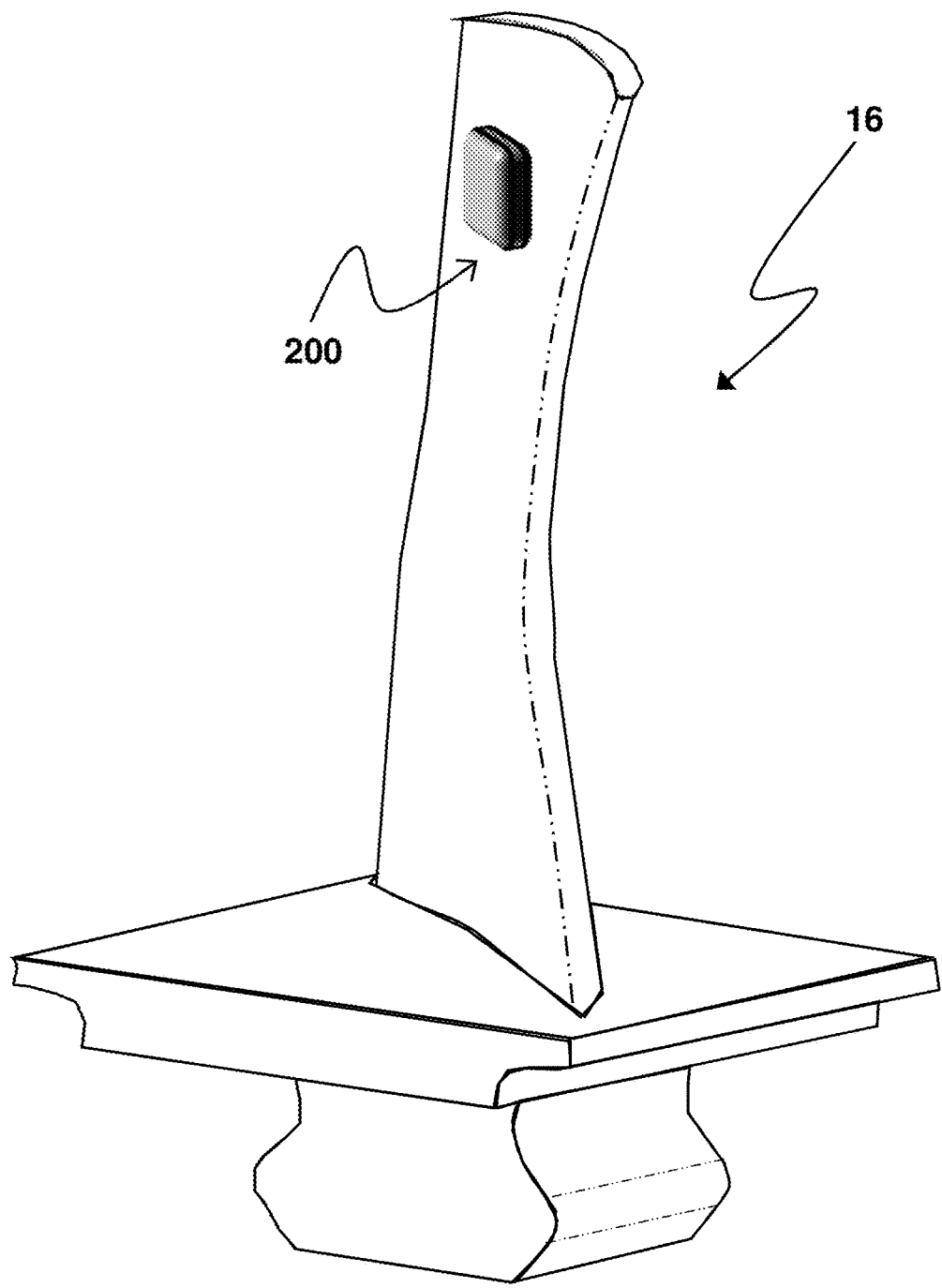
FIG. 16 is a perspective view of an exemplary blade having attached thereto the rotating distance detector of FIG. 13.

FIG. 16 illustrates an exemplary installation of the rotating distance detector 200 on one of the blades 16. The rotating distance detector 200 may be secured to the blade 16 (or the rotor 30, not shown) by a plurality of magnets 260 disposed on the bottom surface 206 of the housing 202, the bottom surface 206 being shown most clearly in FIG. 14. It should be understood that other means of securing the distance detector 200 may instead be used. Such means may include creating a bracket to hold the distance detector 200 that includes a latch/slot or a sliding element/track, providing the housing with slots through which a strap may be fed, and using disposable means, such as zip-ties or rubber bands.

FIG. 17 illustrates the wireless communication between the rotating (blade-mounted) distance detector 200 and a first of the stationary (casing-mounted) distance detectors 120A. The rotating distance detector 200 is mounted to one of the blades 16 attached to the rotor 30 (in this example, a hollow-core rotor) in either the compressor 12 or the turbine 28 in, or approximately in, the same axial plane defined by the stationary distance detectors 120. As the rotor 30 is spun at a slow speed (e.g., using a turning gear), the rotating distance detector 200 continuously transmits a wireless signal, making a series of measurements between its instantaneous position and various stationary distance detectors 120 installed on the compressor casing 14 or turbine shell 36.

The stationary distance detector 120A receives the wireless signals and records the time-of-flight and/or the signal strength. As the blade 16 carrying the rotating distance detector 200 approaches the stationary distance detector 120A, the time-of-flight is shortest, and the signal strength is greatest. As the blade 16 carrying the rotating distance detector 200 moves to position distant from the stationary distance detector 120A, the time-of-flight increases, and the signal strength decreases.

Figure 18:
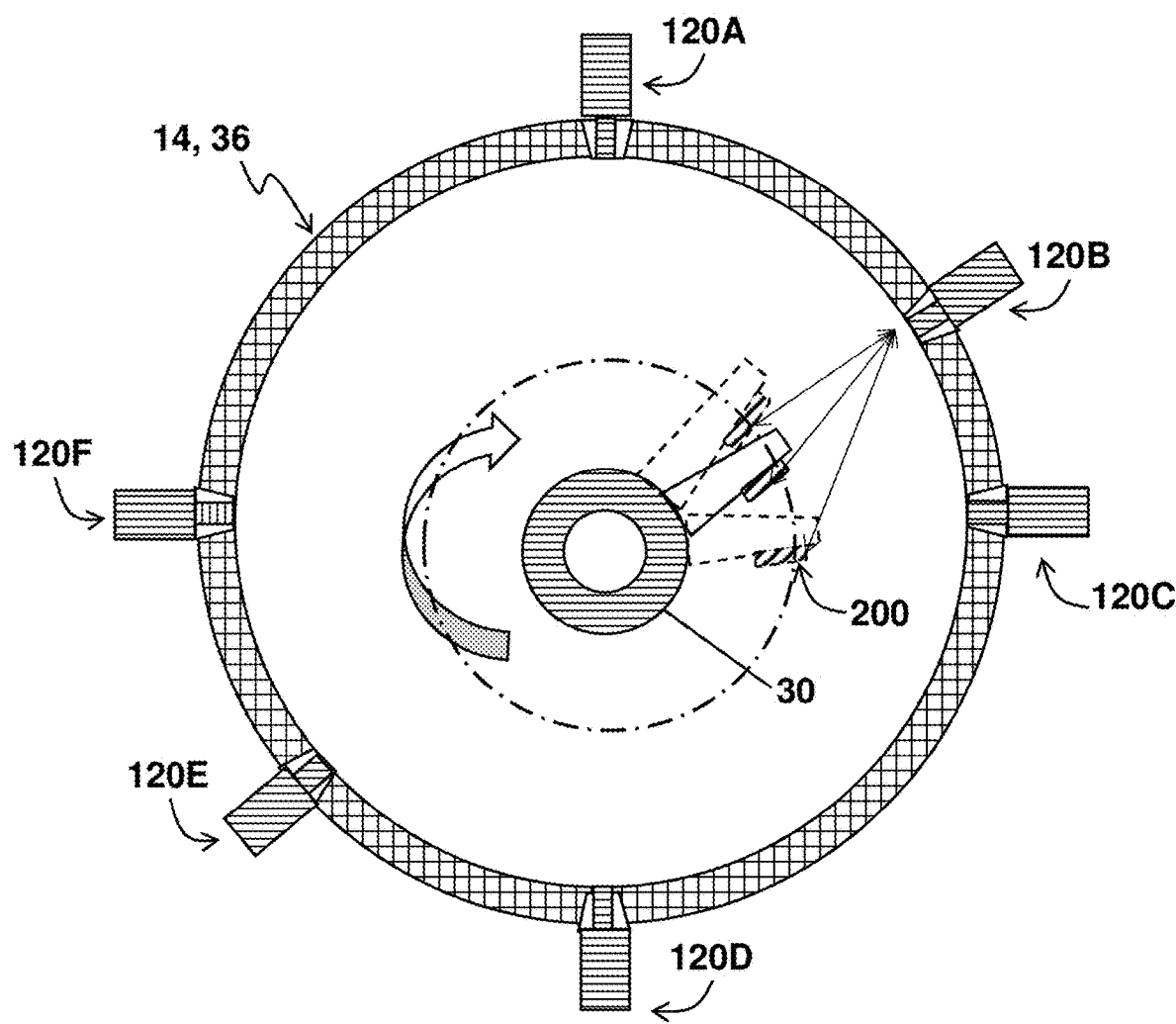
FIG. 18 is a schematic depiction of wireless communication between another of the stationary distance detectors (of FIG. 3) and the rotating distance detector (of FIG. 13)

FIG. 18 illustrates the wireless communication between the rotating (blade-mounted) distance detector 200 and a second of the stationary (casing-mounted) distance detectors 120B. The stationary distance detector 120B receives the wireless signals transmitted from the rotating distance detector 200 and records the time-of-flight and/or signal strength. As the blade 16 carrying the rotating distance detector 200 approaches the stationary distance detector 120B, the time-of-flight is shortest, and the signal strength is greatest. As the blade 16 carrying the rotating distance detector 200 moves to position distant from the stationary distance detector 120B, the time-of-flight increases, and the signal strength decreases.

Figure 19:
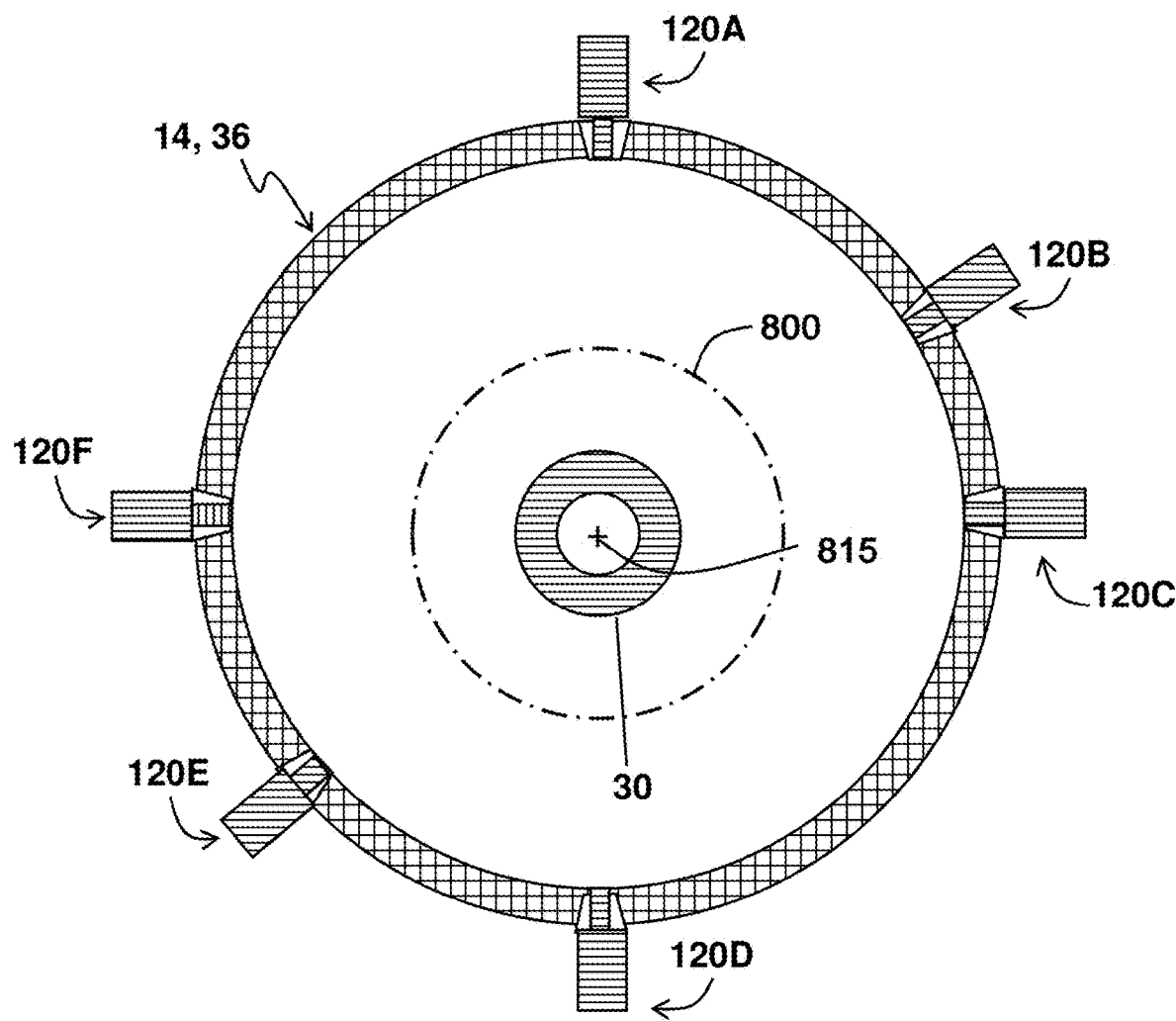
FIG. 19 is a schematic depiction of a plot of points derived from the wireless communication between the stationary distance detectors and the rotating distance detector, as shown in FIGS. 17 and 18.
Figure 21:
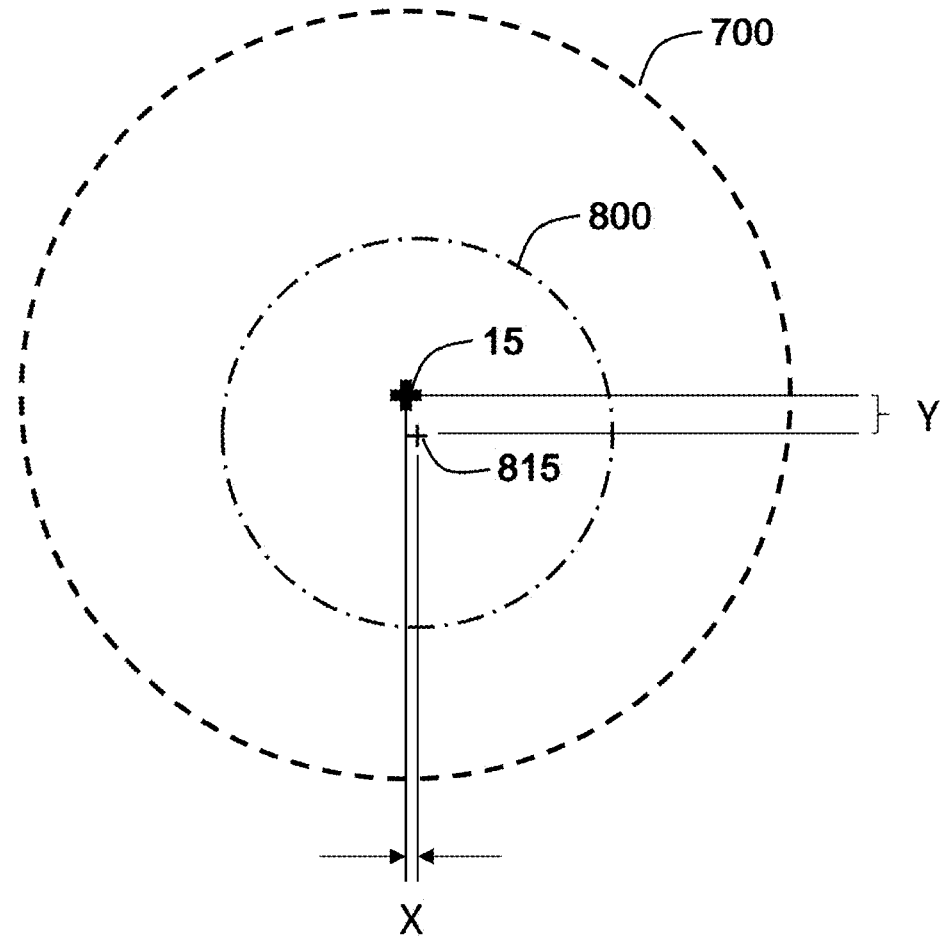
FIG. 21 is an exemplary plot diagram of measurements made using the present eccentricity system.

The measurements are transmitted wirelessly, via the antennas 450, using a wireless local area network (WLAN) 475 produced by the base station 400, as shown in FIG. 10. The measurements are received by the remote computing device 500, which performs calculations on the measurements to generate a data plot 800, as shown in FIGS. 19 and 21 and as discussed below. The remote computing device 500 uses MQ telemetry transport (MQTT) messaging protocol, or another suitable messaging protocol, to communicate with an application loaded on the remote viewing device 560, where the results may be reviewed by a technician.

It should be noted that multiple rotating distance detectors 200 may be used, if desired, to obtain additional distance measurements. Moreover, in the case of multiple detectors, it is not necessary that the detectors 200 be positioned on a respective blade 16. For example, one rotating detector 200 may be mounted to a blade 16, while another rotating detector 200 may be mounted to an axially nearby location on the rotor 30. Additionally, if the rotating detectors 200 are mounted to respective blades 16, it is not required that the detectors 200 be positioned at the same location on the blades 16. The functioning of the present system 1000 is insensitive to the location of the rotating detector(s) 200, as long as the rotating detector(s) 200 is/are in approximately the same axial plane as the stationary detectors 120.

FIG. 19 is a schematic depiction of a plot of points derived from the wireless communication between the stationary distance detectors 120 and the rotating distance detector 200, as described in relation to FIGS. 17 and 18. By best-fitting a circle 800 to the plot of points, the remote computing device 500 (e.g., the computer or server) is able to calculate the rotor center 815. Once the rotor center 815 is calculated, the rotor center 815 may be compared to the casing center 15 to determine if the eccentricity of the casing 14 or turbine shell 36 relative to the rotor 30 is within a predetermined specification.

Figure 20:
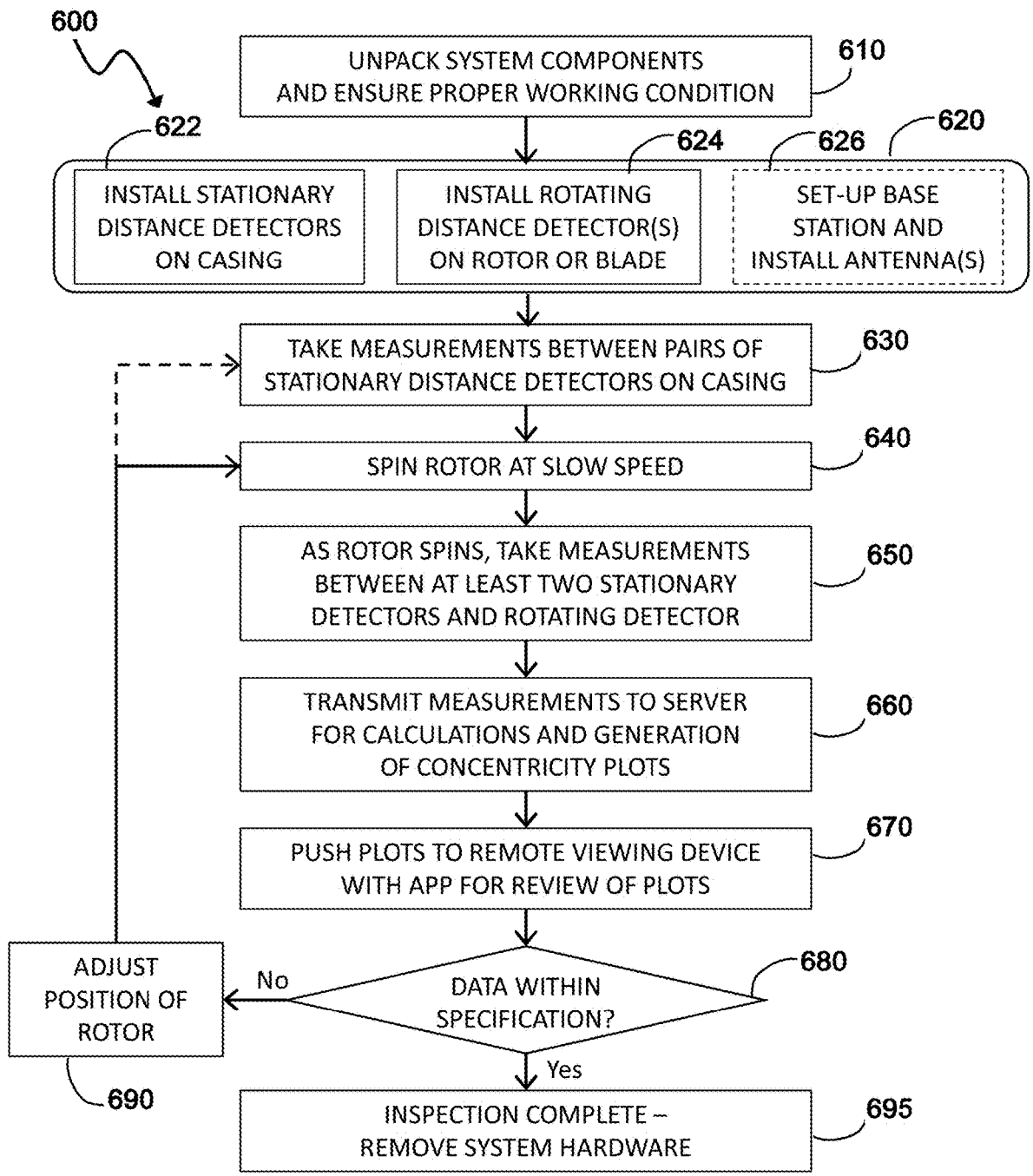
FIG. 20 is a flow chart outlining a process of using the present eccentricity measurement system to ensure alignment of a gas turbine casing with a rotor.

FIG. 20 is a flow chart outlining a process 600 of using the present eccentricity measurement system 1000 to ensure proper alignment of a casing 14 with a rotor 30. In step 610, the system 1000 containing the distance detectors 120, 200 and, optionally, the base station 400 is unpacked and bench-tested to ensure the distance detectors 120, 200 and the base station 400 are in proper working order.

In step 620, the system is set up and readied for use. Specifically, in step 622, a set of (at least three) stationary distance detectors 120 are installed through the casing penetrations 102 (or 104 or 106 or 108 or 110) in a single axial plane. The technician conducting the readings to determine the eccentricity of the casing 14 relative to the rotor 30 inputs the relative circumferential positions of each distance detector 120A, 120B, and 120C into a computer program (not shown) hosted on the remote computing device 500, or into a smart device application hosted on a remote viewing device 560 (e.g., a tablet computer).

In step 624, the rotating distance detector 200 is mounted on a rotating component (e.g., the rotor 30 or a blade 16 in the compressor 12 or the turbine 28) in approximately the same axial plane as stationary first distance detectors 120.

In optional step 626, if an existing wireless network is unavailable or is insufficiently strong, the base station 400 is set up near the gas turbine 10, and the antenna(s) 480 are mounted in appropriate locations proximate to the gas turbine 10 and are connected to antenna ports 412 of the base station 400. Step 622, step 624, and optional step 626 may occur in any order.

In step 630, a series of measurements are taken between respective pairs of the stationary distance detectors 120, so that a center 15 of the casing 14 or 36 can be calculated (step 660). As discussed above, the number of measurements increases with the number of stationary distance detectors 120 transmitting signals among one another.

In step 640, the lubrication system containing the lift oil for the turbine bearings is activated, and the rotor 30 is rotated at slow speed (e.g., 5 rpm). This may be accomplished by using a turning gear.

In step 650, as the rotor 30 spins, the rotating distance detector 200 mounted to a rotating component is conveyed in a path around the rotor 30 and, in transit, makes a series of measurements of distance between its instantaneous position and at least two of the stationary distance detectors 120 installed on the casing 14 or 36.

In step 660, the measurement data is transmitted wirelessly from the distance detectors 120 and/or 200, via the wireless network 475 that may have been generated by the base station 400. The data is transmitted over the wireless network 475 to the remote computing device 500, which generates a plot of the data and performs calculations to produce a circle that is best fit to the data (as shown in FIG. 21).

In step 670, the resulting data compilation is pushed to a remote viewing device 560, such as a tablet computer, where the data is reviewed by a technician on an app designed for such purpose and loaded onto such device 560.

In step 680, the technician determines whether the measured data indicates that the eccentricity of the casing 14 or 36 relative to the rotor 30 is within a predetermined specification. If the eccentricity of the casing 14 or 36 and the rotor 30 is within specification, the inspection is complete, and the system 1000 is removed (step 695).

However, if the eccentricity of the casing 14 or 36 and the rotor 30 is not within specification, the position of the rotor 30 is adjusted (step 690), and a subsequent scan is performed, beginning with either step 630 or step 640. The adjustment and scanning process may be repeated until the eccentricity is within specification.

The process of steps 620 through 695 may be repeated at a second axial stage to determine the inclination of the rotor 30 between the first axial stage and the second axial stage.

FIG. 21 illustrates exemplary pilot plot displays of data 700, 800, respectively, as conveyed from the distance detectors 120, 200 to the remote computing device 500 (such as the server shown in FIG. 10), which performs calculations on the data and transmits the results to the app installed on the remote viewing device 560. The exemplary plot display of data 700 collected from the stationary distance detectors 120 represents the interior surface 113 of the casing 14 or 36 and its center 15 (represented by a large "+" sign), while the exemplary plot display of data 800 collected from the rotating distance detector 200 represents a path of the distance detector 200 as the distance detector 200 was rotated about the rotor 30. By best-fitting a circle to the data points 800, a rotor center 815 (represented by small "+" sign) can be calculated by the remote computing device 500.

The remote computing device 500 fits a circle 700, 800 to the data sets, using any method of iterative optimization to find the minimum of the orthogonal distance regression. In an exemplary practice, the Nedler-Mead (Simplex) optimization is used, since it does not require the calculation of any derivatives or the solving of any matrices.

The distance between the casing center 15 and the rotor center 815 may be reported in inches (or other units) along the X and Y axes. The app may display the "X" and "Y" offsets to aid the technician in determining whether the eccentricity is within specification. The predetermined specifications for particular gas turbines may be pre-loaded into the app, so that the app communicates an alert notification when the eccentricity is outside specification. Alternately, the technician may be provided with the predetermined specifications and may manually assess whether the eccentricity is within specification.

In many circumstances, the target center of the casing 14 or 36 at a particular stage (e.g., the aft stage) is not coincident with the rotor center 815. Rather, a defined amount of offset is employed to accommodate changes in position of the rotor 30 and the geometry of the casing 14 or 36, as may be expected to occur during operation of the gas turbine system 10 (as the gas turbine 10 becomes heated). The present system allows the technician to determine the actual center 15 of the casing 14 or 36 and provides direction to adjust the calculated center 815 of the rotor 30 to a predetermined target center (not shown), which may be offset from the center 15 of the casing 14.

Further, comparing the calculated center 815 of the rotor 30 at a forward compressor stage with the calculated center 815 of the rotor 30 at an aft stage allows the technician to determine if the rotor 30 is angled (either upward or downward) as the rotor 30 extends through the compressor 12. If necessary, adjustments may be made to the bearings supporting the compressor rotor 30 to achieve the desired eccentricity and degree of inclination (if any).

Similarly, comparing the calculated center 815 of the rotor 30 at a forward turbine stage with the calculated center 815 of the rotor 30 at an aft turbine stage allows the technician to determine if the rotor 30 is angled (either upward or downward) as the rotor 30 extends through the turbine 28. If necessary, adjustments may be made to the bearings supporting the rotor 30, or the turbine shell 36, to achieve the desired eccentricity and degree of inclination (if any).

It is to be understood that the forward-, mid-, and aft-stage measurements in the compressor 12 and/or the turbine 28 may be taken simultaneously or sequentially, depending on the number of distance detectors 120, 200 that are available. Alternately, in some instances, the measurement of the eccentricity of the casing 14 relative to the rotor 30 may be taken only at a single stage (e.g., a forward stage).

Figure 22:
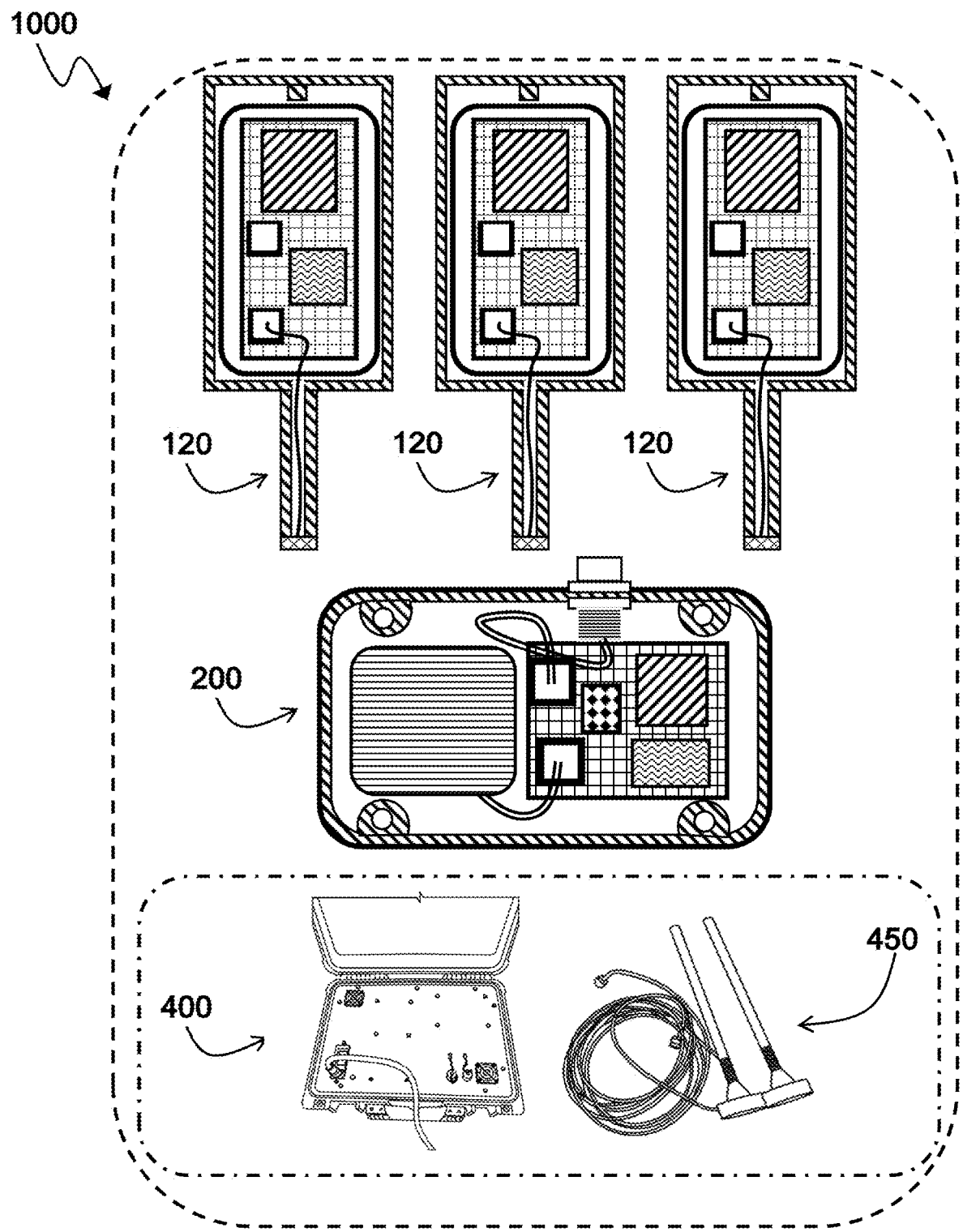
FIG. 22 illustrates components of the eccentricity measurement system of the present disclosure, including the stationary distance detector of FIG. 3 (three units), the rotating distance detector of FIG. 13 (one unit), and, optionally, the base station of FIG. 8 and at least one antenna of FIG. 9.

FIG. 22 illustrates the present eccentricity measurement system 1000. The system 1000 includes at least three of the stationary (casing-mounted) distance detectors 120 and at least one rotating distance detector 200 (mounted to the rotor or the blade), which are collectively used to measure the eccentricity of the casing 14 or 36 relative to the rotor 30 at one or more stages of the compressor 12 and/or the turbine 28. By measuring at multiple stages (e.g., at the forward stage and at the aft stage of the compressor 12; at the forward stage and at the aft stage of the turbine 28; or at the forward stage of the compressor 12 and at the aft stage of the turbine 28), the inclination of the rotor 30 over the measured span may be determined. The distance detectors 120, 200 communicate with one another wirelessly over a wireless local area network 475. If a wireless network is unavailable near the gas turbine 10 or is insufficiently strong, the base station 400 and one or more antennas 450 may be used to create a wireless local area network for transmission of the signals.

The present system 1000 uses distance detectors 120, 200 that produce wireless (radio frequency) signals. It is contemplated that other types of detectors may instead be used. Examples of other systems include, but are not necessarily limited to, acoustic positioning systems (e.g., using ultrasonic, sonar, doppler, and baseline systems with long, short, or ultrashort frequency sound waves); structured light systems (e.g., using white light or blue light, as may be used in 3D spatial mapping technology); other types of electromagnetic energy (e.g., radio waves, columnated light/laser waves, and infrared waves, which may be used with measurement techniques, such as time-of-flight, phase shift, phase interference, signal strength decay, wideband delay lock loop, and radar measurement); and global positioning systems (GPS).

In many of the above systems using other types of wave emissions, it may be possible to have certain (e.g., two) casing-mounted distance detectors be configured to send and receive emissions, and the remaining distance detectors may be provided with a reflective surface that returns the emitted energy to the originating detector. For example, the time-of-flight of the signal is calculated as the time required for the energy to travel from the originating detector to the receiving detector, be reflected off the receiving detector, and to travel back to the originating detector. Similarly, the distance detector mounted to the rotating component may be provided with a reflective surface that returns the energetic transmission to the casing-mounted detectors.

The terminology used herein is to describe particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described step or event may or may not occur and that the description includes instances where the step or event occurs and instances where it does not.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described to best explain the principles of the present eccentricity measurement system and method and their practical application and to enable others of ordinary skill in the art to understand the disclosure of various embodiments with various modifications as are suited to the particular use contemplated.

What is claimed is:

1. A system for determining eccentricity of a casing relative to a rotor of a gas turbine, the system comprising:
   a set of stationary distance detectors installed on the casing at known circumferential positions along a first axial plane, the set of stationary distance detectors comprising a first distance detector, a second distance detector, and a third distance detector;
   the first distance detector comprising a first housing, a first microcontroller contained within the first housing, a first antenna coupled to the first housing, and a first wireless network transceiver coupled to a distal end of the first antenna;
   the second distance detector comprising a second housing, a second microcontroller disposed within the second housing, a second antenna coupled to the second housing, and a second wireless network transceiver coupled to a distal end of the second antenna;
   the third distance detector comprising a third housing, a third microcontroller disposed within the third housing, a third antenna coupled to the third housing, and a third wireless network transceiver coupled to a distal end of the third antenna;
   a rotating distance detector affixed to a rotating component of the gas turbine in or near the first axial plane, the rotating component being one of the rotor, a compressor blade, and a turbine blade, the rotating distance detector comprising a fourth housing, a fourth microcontroller disposed within the fourth housing, and a fourth wireless network transceiver coupled to the fourth microcontroller;
   wherein the first distance detector transmits a first wireless signal to the second distance detector and receives a second wireless signal from the second distance detector to measure a first distance between the first distance detector and the second distance detector;
   wherein the first distance detector transmits a third wireless signal to the third distance detector and receives a fourth wireless signal from the third distance detector to measure a second distance between the first distance detector and the third distance detector;
   wherein, as the rotor spins, the rotating distance detector transmits a series of fifth wireless signals to the first distance detector, the second distance detector, and the third distance detector, thereby defining a series of path lengths indicative of respective third distances between the fourth distance detector and each of the first distance detector, the second distance detector, and the third distance detector;
   wherein one or more of the first distance detector and the rotating distance detector transmits measurements of the first distance, the second distance, and the respective third distances over a wireless local area network; and
   a remote computing device for processing the measurements of the first distance, the second distance, and the respective third distances into an eccentricity plot of the casing relative to the rotor at the first axial plane.

2. The system of claim 1, wherein the casing defines a plurality of casing penetrations; and wherein each of the respective antennas of the first distance detector, the second distance detector, and the third distance detector are disposed through respective ones of the plurality of casing penetrations, and each of the first housing, the second housing, and the third housing are disposed radially outward of the casing.

3. The system of claim 1, wherein the second distance detector transmits a sixth wireless signal to the third distance detector and receives a seventh wireless signal from third distance detector to measure a fourth distance between the second distance detector and the third distance detector.

4. The system of claim 3, wherein the set of stationary distance detectors further comprises a fourth distance detector comprising a fifth housing, a fifth microcontroller disposed within the first housing, a fifth antenna coupled to the fifth housing, and a fifth wireless network transceiver coupled to a distal end of the fifth antenna; and wherein the first distance detector transmits an eighth wireless signal to the fourth distance detector and receives a ninth wireless signal from the fourth distance detector to measure a fifth distance between the first distance detector and the fourth distance detector.

5. The system of claim 4, wherein the casing has a circular cross-section along the first axial plane; and wherein the first distance detector, the second distance detector, the third distance detector, and the fourth distance detector are circumferentially spaced about the compressor casing, such that each quadrant of the circular cross-section has a respective distance detector.

6. The system of claim 5, wherein the first distance detector, the second distance detector, the third distance detector, and the fourth distance detector are equally circumferentially spaced.

7. The system of claim 4, wherein each of the first distance detector, the second distance detector, the third distance detector, and the fourth distance detector comprises an additional wireless network transceiver coupled to the microcontroller within the housing.

8. The system of claim 1, wherein the rotating distance detector further comprises a battery disposed within the housing; and a power switch coupled to the microcontroller.

9. The system of claim 1, wherein the fourth housing of the rotating distance detector comprises a surface having a plurality of magnets affixed thereto; and wherein the surface having the plurality of magnets is disposed in contact with a surface of the rotating component.

10. The system of claim 1, further comprising a remote viewing device in wireless communication with the remote computing device, the remote viewing device comprising a tablet computer on which an app for receiving and displaying the eccentricity plot is loaded.

11. The system of claim 1, wherein the wireless local area network is produced by a portable base station comprising a wireless transceiver, the portable base station located in proximity to the casing.

12. The system of claim 11, further comprising at least one external antenna coupled to the portable base station, the at least one external antenna being installed on or within the casing.

13. A method for determining eccentricity of a casing relative to a rotor of a gas turbine, the method comprising:
(a) installing on the casing, in known circumferential positions along a first axial plane, a set of stationary distance detectors comprising a first distance detector, a second distance detector, and a third distance detector, wherein each of the first distance detector, the second distance detector, and the third distance detector comprises a housing, a microcontroller disposed within the housing, an antenna coupled to the housing, and a wireless network transceiver coupled to a distal end of the antenna;
(b) installing on a rotating component, in or near the first axial plane, a rotating distance detector, the rotating distance detector comprising a housing, a microcontroller disposed within the housing, and a wireless network transceiver, the rotating component comprising one of a compressor blade, a turbine blade, and the rotor;
(c) taking a first series of measurements of respective distances between respective pairs of the first distance detector, the second distance detector, and the third distance detector by transmitting and receiving wireless signals, over a wireless local area network, among the first distance detector, the second distance detector, and the third distance detector;
(d) taking a second series of measurements of respective distances between the rotating distance detector and each of the first distance detector, the second distance detector, and the third distance detector by transmitting and receiving wireless signals, over the wireless local area network, among the first distance detector, the second distance detector, and the third distance detector, and the rotating distance detector, as the rotor is spun at a slow speed;
(e) transmitting the first series of measurements and the second series of measurements to a remote computing device, the remote computing device performing calculations and generating an eccentricity plot for the first axial stage; and
(f) delivering the eccentricity plot for the first axial stage to a remote viewing device for review to determine if the eccentricity is within a predetermined specification.

14. The method of claim 13, further comprising adjusting the position of the rotor if the eccentricity of the first axial stage is outside the predetermined specification.

15. The method of claim 14, further comprising repeating at least steps (d), (e), and (f) after adjusting the position of the rotor.

16. The method of claim 13, further comprising repeating steps (a) through (f) at a second axial plane distal to the first axial plane.

17. The method of claim 16, further comprising adjusting the position of the rotor if both the eccentricity of the first axial stage and the eccentricity of the second axial stage are outside the predetermined specifications.

18. The method of claim 16, wherein the first axial plane is disposed in a compressor of the gas turbine, and the second axial plane is disposed in a turbine of the gas turbine.

19. The method of claim 16, wherein the first axial plane and the second axial plane are disposed in a compressor of the gas turbine.

20. The method of claim 16, wherein the first axial plane and the second axial plane are disposed in a turbine of the gas turbine.

* * * * *